US009568618B2

(12) United States Patent
Nishihara et al.

(10) Patent No.: US 9,568,618 B2
(45) Date of Patent: Feb. 14, 2017

(54) SEMICONDUCTOR PHOTODETECTOR AND RADIAL RAY DETECTOR

(71) Applicant: Sony Corporation, Tokyo (JP)

(72) Inventors: Toshiyuki Nishihara, Kanagawa (JP); Hirofumi Sumi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 30 days.

(21) Appl. No.: 14/394,216

(22) PCT Filed: Apr. 9, 2013

(86) PCT No.: PCT/JP2013/060735
§ 371 (c)(1),
(2) Date: Oct. 13, 2014

(87) PCT Pub. No.: WO2013/157448
PCT Pub. Date: Oct. 24, 2013

(65) Prior Publication Data
US 2015/0115163 A1 Apr. 30, 2015

(30) Foreign Application Priority Data
Apr. 20, 2012 (JP) .................................. 2012-096651
Mar. 7, 2013 (JP) .................................. 2013-045126

(51) Int. Cl.
*H04N 5/353* (2011.01)
*G01T 1/208* (2006.01)
(Continued)

(52) U.S. Cl.
CPC ............. *G01T 1/208* (2013.01); *G01T 1/1642* (2013.01); *G01T 1/1647* (2013.01);
(Continued)

(58) Field of Classification Search
CPC ...... G01T 1/208; G01T 1/1642; G01T 1/1647; H04N 5/2353; H04N 5/32; H04N 5/353
See application file for complete search history.

(56) References Cited

U.S. PATENT DOCUMENTS 5,319,696 A * 6/1994 Abdel-Malek ........... H05G 1/60
378/108
5,554,850 A * 9/1996 Hejazi .................. G01T 1/2018
250/367

(Continued)

FOREIGN PATENT DOCUMENTS

JP 2004-077132 3/2004
JP 2006-508344 3/2006
(Continued)

*Primary Examiner* — Christine Sung
(74) *Attorney, Agent, or Firm* — Dentons US LLP

(57) ABSTRACT

Provided is a radiation detector including a scintillator which generates, when a radial ray enters, scintillation light having light intensity according to energy of the radial ray, and then supplies a photon of the scintillation light to each of a plurality of pixels, a radial ray detection unit which detects whether or not the radial ray is made to enter based on a number of the photons supplied in an exposure period whenever the plurality of pixels are exposed by the scintillation light over the exposure period, and an exposure period adjusting unit which adjusts the exposure period based on an incident frequency of the detected radial ray.

9 Claims, 21 Drawing Sheets

(51) Int. Cl.
*H04N 5/32* (2006.01)
*G01T 1/164* (2006.01)
*H04N 5/235* (2006.01)

(52) U.S. Cl.
CPC .............. *H04N 5/2353* (2013.01); *H04N 5/32* (2013.01); *H04N 5/353* (2013.01)

(56) References Cited

U.S. PATENT DOCUMENTS

| | | | | |
|---|---|---|---|---|
| 5,585,638 | A * | 12/1996 | Hoffman | G01T 1/2018 250/370.07 |
| 6,873,682 | B2 * | 3/2005 | Francke | A61B 6/032 378/108 |
| 2002/0085672 | A1 * | 7/2002 | Ganin | A61B 6/00 378/108 |
| 2006/0071171 | A1 * | 4/2006 | Kameshima | A61B 6/00 250/370.09 |
| 2007/0165781 | A1 * | 7/2007 | Aslund | A61B 6/542 378/97 |
| 2008/0191139 | A1 * | 8/2008 | Coello | H04N 3/155 250/370.09 |
| 2011/0019798 | A1 * | 1/2011 | Kang | A61B 6/06 378/62 |

FOREIGN PATENT DOCUMENTS

| | | |
|---|---|---|
| JP | 2006-122667 | 5/2006 |
| JP | 2006-242958 | 9/2006 |
| JP | 2008-206971 | 9/2008 |
| JP | 2009-053104 | 3/2009 |
| JP | 2011-024773 | 2/2011 |
| JP | 2011-097581 | 5/2011 |

* cited by examiner

FIG. 27
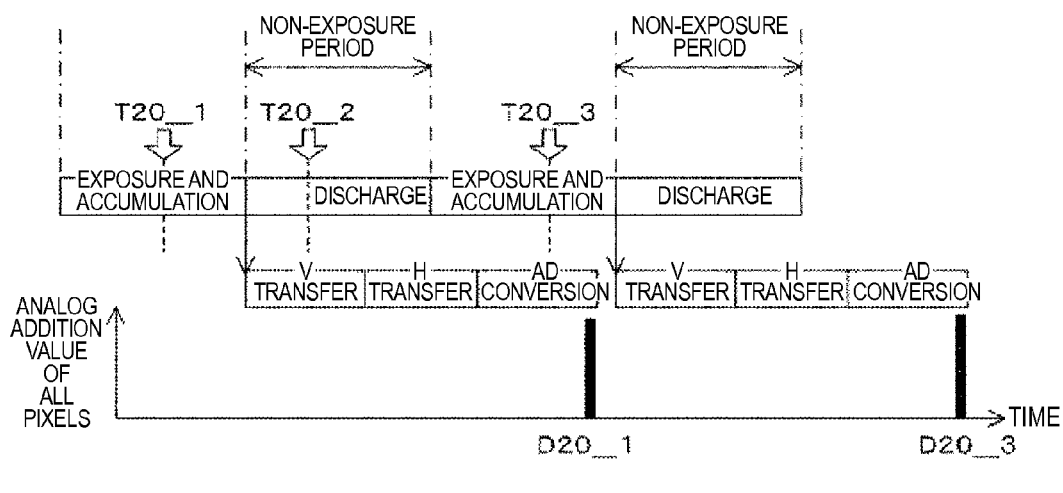
a
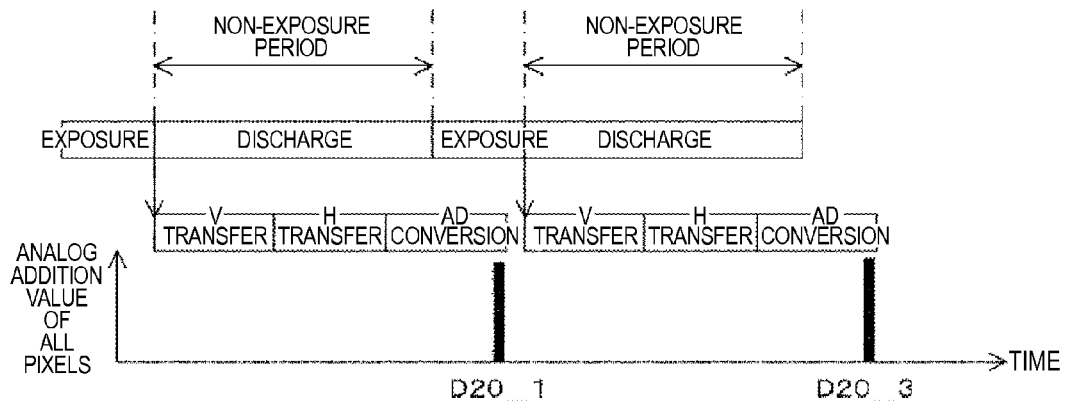
b

SEMICONDUCTOR PHOTODETECTOR AND RADIAL RAY DETECTOR

TECHNICAL FIELD

The present technique relates to a semiconductor photodetector and a radial ray detector employing photocounting.

BACKGROUND ART

In recent years, medical diagnostic devices employing photon counting of radial rays typified by a Single Photon Emission Computed Tomography (SPECT: gamma camera) and a Positron Emission Tomography (PET) have been increasingly introduced. In the photon counting of radial rays, a detector is required to have high time resolution and also perform detection of the energy intensity of each single-photon radial ray, and count filtering according to the energy intensity is carried out.

For example, a slight amount of a gamma-ray source, such as technetium, is introduced into the inside of the living body, and then a gamma-ray source distribution in the living body is determined from position information of gamma rays to be emitted, whereby associated diseases, such as a blood-flow state in the living body and ischemia, are diagnosed. For the detection, a SPECT (gamma camera) device is used and a scintillator and a photomultiplier are usually used as a detector of gamma rays.

The basic configuration of the SPECT device is introduced in FIG. 25 and the like, for example, in a prior art of Patent Literature 1 (JP 2006-242958A). A specific example of signal processing for determining the incident position and the energy intensity of the gamma rays entering the detector is described in Patent Literature 2 (JP 2006-508344T), for example.

FIG. 1 is a view for explaining the outline of gamma ray detection. In the gamma ray detection, when a gamma ray 2 generated from a gamma-ray source 1 in the living body enters a scintillator 4 passing through a collimator 3, the scintillator 4 exhibits a fluorescence, and then the fluorescence is detected by photomultipliers 5 disposed in the shape of an array. The photomultipliers 5 amplify the same to produce current pulses, and then the current pulses are output to an arithmetic unit 7 as an incident light quantity value to each photodetection element through a converter 6 containing a voltage converter, an amplifier, and an A/D converter.

On the other hand, a gamma ray 8 which undergoes Compton scattering in the living body to be attenuated passes the collimator 3, and then detected in some cases. The signal is a noise which has lost the original position information. Or, a noise emitted as an unusually high signal caused by cosmic rays or the like is mentioned. The SPECT device filters these noises by energy discrimination from primary gamma rays which are not subjected to scattering. The arithmetic unit 7 performs the noise discrimination and the position determination of each gamma ray based on an output from the converter 6 connected to each photomultiplier. When the scintillator 4 is formed with a solid plate, the light emission is simultaneously detected by the plurality of photomultipliers 5. The arithmetic unit 7 specifies the gamma ray energy from the total output and specifies the incident position of the gamma rays from the center of gravity of the output, for example. In order to determine each gamma ray incidence as an independent event, these operation need to be performed at very high speed. Thus, the number of times of events of the gamma rays which are determined to be a primary (not a noise) is counted, and then the gamma-ray source distribution in the living body is identified.

The photon counting of radial rays involving such energy discrimination has been adopted also for X-ray transmission imaging in addition to transmission imaging using gamma rays having high transmission ability in recent years, and the effect has been increasingly recognized. For example, Patent Literature 3 (JP 2011-24773A) and Patent Literature 4 (JP 2004-77132A) each describe one example of such devices, and the application thereof to a mammography and an X-ray Computed Tomography (CT) has been expected. However, since the frequency of the incident radial rays is high in the case of X-rays, the photon counting has been demanded to have time resolution higher than that of gamma rays for medical treatment.

On the other hand, in Patent Literature 5 (JP 2011-97581A), the applicant suggests a new image pickup device by photon counting in which the dynamic range is increased using time division and screen division by a plurality of pixels in combination while following the circuit configuration of a Complementary Metal Oxide Semiconductor (CMOS) imager. Such a device can also be used as a device for photon counting in which the entire pixel array in a chip is one light receiving surface.

When detecting radial rays using such a semiconductor image pickup device and a scintillator, the number of photons emitted from the scintillator with the incidence of the radial rays reflects the energy intensity of the radial rays. By performing photon counting thereof, the detection sensitivity comparable to that of a photomultiplier can be achieved. However, the scintillation light is subjected to the photon counting herein and the number of photons of the radial rays is not counted.

CITATION LIST

Patent Literature

Patent Literature 1: JP 2006-242958A
Patent Literature 2: JP 2006-508344T
Patent Literature 3: JP 2011-24773A
Patent Literature 4: JP 2004-77132A
Patent Literature 5: JP 2011-97581A

SUMMARY OF INVENTION

Technical Problem

As the photon counting of radial rays described above, one employing scintillation and a photomultiplier has been mainly used. Or, a direct detection has been performed employing a special semiconductor, such as cadmium telluride (CdTe). When the radial ray photon counting is attempted to be introduced into X-ray mammography and CT imaging employing these light receiving devices, a size reduction of light receiving units which form pixels is difficult to achieve and also there is a possibility that the time resolution is insufficient. More specifically, each light receiving unit and each processing unit receive incidence of one X-ray, and then perform detection and energy determining processing thereof but the following X-ray enters before the processing is completed in some cases. This situation results in the fact that the device cannot perform correct energy discrimination and counting of emitted X-rays.

For example, the number of radial rays entering per 1 $mm^2$ of the light receiving unit is 100 radial rays/second or less in the case of a gamma camera but, in contrast thereto, the number is several tens of thousands to several millions in the case of the mammography and further the number increases by order of magnitude in the case of the CT imaging. In order to count all the radial rays, it is necessary to complete a detection and judgment cycle in several microseconds or in a nanosecond order. Therefore, in order to apply the radial ray photon counting to the mammography or the CT imaging, a new photodetection unit capable of overcoming the time resolution problem is required.

On the other hand, when performing the photodetection following the circuit configuration of a common CMOS imager, the time resolution of the photodetection is prescribed by the frame rate. The frame rate is prescribed by the circuit performance required for reading all the effective pixels and outputting the same and is usually represented by an order of several milliseconds to several tens of milliseconds and the dynamic range is insufficient for the photon counting of radial rays. The above-described circumstances similarly apply to a semiconductor photon counter described in Patent Literature 5 (JP 2011-97581A).

The circumstances are briefly described with reference to FIG. 2 and FIG. 3. FIG. 2 is a view illustrating the general circuit configuration of a CMOS imager.

In the CMOS imager, pixels PX of 64 rows×64 columns are disposed in the shape of an array. Incident light detected in each pixel is accumulated in the pixel as a photoelectrically-converted charge. Detection judging circuits 11 each have an Analog to Digital (AD) converter, for example, and 64 pixels are connected to each of the detection judging circuits 11. One row is selected when reading the pixel output to the detection judging circuit 11, and then the outputs of the 64 pixels are read in parallel to the 64 detection judging circuits 11 to be AD-converted and digitally judged. The detected and judged output result of each pixel is once stored in a register 12, transmitted to an output circuit 13 within a read-out period of the next row, and then output as digital data. The reading of each row is successively performed in a cyclical manner, and 64 times of the reading complete one cycle. Since a photodiode is reset when the accumulated charges are transmitted for the reading, the period between each reading is an exposure period and an accumulation period of the photoelectrically converted charges.

Herein, it is supposed to use such a CMOS imager, in place of the photomultipliers 5 of FIG. 1, as a light receiving element having a single light receiving surface PD1. For example, it is supposed that a light diffusing unit is disposed on the front surface of each CMOS imager, and the fluorescence from the scintillator 4 almost uniformly enters the CMOS imagers. In FIG. 3, the output result from each row of the CMOS imager is indicated as the total output of the 64 pixels selected in each row. When a gamma ray enters the scintillator at a timing T1_1, the fluorescence generated then is simultaneously received by all the pixels, and then output one by one with the reading of each row. Then, a significant output D1_1 continuously generates until the reading of all the effective rows completes one cycle. Furthermore, when the following gamma ray enters the scintillator at a timing T1_2, an output D1_2 similarly generates.

For example, when 5 μsec is required for the reading of each row in the CMOS imager, 320 μsec is required for completing one cycle of 64 rows, and the outputs D1_1 and D1_2 continuously generate during the period. Herein, when a gamma ray enters the scintillator at an interval shorter than 320 μsec, the output D1_1 and the output D1_2 are mixed, which makes it impossible to perform the energy determination and the photon counting of the gamma rays. More specifically, the time resolution of the CMOS imager is prescribed by a so-called frame rate.

Since the imaging of the common CMOS imager is performed on the basis of the frame unit, a blank period is inserted between the reading of a final address row and the reading of a start address row in order to adjust the cycle to one frame period, and access of a shielding pixel or a dummy pixel and the like are usually performed. More specifically, the effective pixel rows are not always accessed at the same interval in a cyclical manner.

Due to the presence of the blank period, a blank or a meaningless output is inserted in the halfway of the output of D2_1 or D2_2, which becomes an obstacle in processing the same as a pulse output generated according to the incidence of radial rays.

The present technique has been produced in view of such circumstances and provides a semiconductor photodetector and a radial ray detector which can increase the time resolution of photodetection and which achieves energy discrimination and photon counting of radial rays.

Solution to Problem

The present technology has been made in order to solve the above problems, and according to a first aspect thereof, there is provided a radiation detector including a scintillator which generates, when a radial ray enters, scintillation light having light intensity according to energy of the radial ray, and then supplies a photon of the scintillation light to each of a plurality of pixels, a radial ray detection unit which detects whether or not the radial ray is made to enter based on a number of the photons supplied in an exposure period whenever the plurality of pixels are exposed by the scintillation light over the exposure period, and an exposure period adjusting unit which adjusts the exposure period based on an incident frequency of the detected radial ray. This produces an effect that the exposure time is adjusted based on the radial ray incident frequency.

According to the first aspect, an exposure control unit which exposes each of a plurality of divisions each containing the plurality of pixels one by one by the scintillation light over the exposure period may be further included, and the radial ray detection unit may detect whether not the radial ray is made to enter whenever any one of the plurality of divisions is exposed. This produces an effect that the radial ray is detected whenever any of the plurality of divisions is exposed.

According to the first aspect, the exposure control unit may expose two divisions adjacent in an exposure order while partially overlapping the exposure period of each of the divisions, and the radial ray detection unit may detect that the radial ray is made to enter once in both the two divisions when it is detected that the radial ray is made to enter both the two adjacent divisions. This produces an effect that when the radial rays are detected in both the two adjacent divisions, the radial rays are detected once in the two divisions.

According to the first aspect, the exposure control unit may expose, after completion of exposure of one of two divisions adjacent in an exposure order, exposes the other, and the radial ray detection unit may determine a number of times that the radial ray is made to enter in the exposure period and in the fixed period from a detection result of the radial rays in the exposure period. This produces an effect that the number of times that the radial rays are made to enter in the fixed period and in the exposure period is determined from the detection results of the radial rays in the exposure period.

According to the first embodiment, a plurality of reading circuits which simultaneously read output values of the pixels according to the number of the photons in the divisions different from each other, and supplied the output values to the radial ray detection unit may be included, and the radial ray detection unit may detect whether or not the radial rays are made to enter from the output values. This produces an effect that the output values of the pixels are simultaneously read in the divisions which are different from each other.

According to the first aspect, an exposure control unit which exposes the plurality of pixels by the scintillation light over the exposure period, and, after a fixed period passes after the exposure period ends, exposes the plurality of pixels again by the scintillation light over the exposure period may be further included, and the radial ray detection unit may determine a number of times that the radial rays are made to enter in the exposure period and the fixed period from the detection result of the detection target radial rays in the exposure period. This produces an effect that the number of times that the radial rays are made to enter in the exposure period and in the fixed period is determined from the detection results of the radial rays in the exposure period.

According to the first aspect, the exposure period adjusting unit may shorten the exposure period as the incident frequency is higher and lengthen the exposure time as the incident frequency is lower. This produces an effect that when the incident frequency is lower, the exposure time is longer and when the incident frequency is higher, the exposure period is shorter.

According to the first aspect, a light uniformizing unit which substantially uniformizes light quantity of the scintillation light, and then guides the light to the plurality of pixels may be further included. This produces an effect that the light quantity of the scintillation light is almost uniformized, and then guided to the plurality of pixels.

Further, each of the plurality of pixels may supply, to the radial ray detection unit, an output value according to the number of the photons supplied to the pixels in the exposure period. This produces an effect that the output values according to the number of the photons supplied to the pixels in the exposure period are supplied.

Advantageous Effects of Invention

According to the present technique, the time resolution of photodetection can be increased and the energy discrimination and the photon counting of radial rays can be achieved.

BRIEF DESCRIPTION OF DRAWINGS

FIG. 27 includes FIGS. 27a and 27b showing an example of exposure and accumulation and reading timing of each divided region in the image pickup device of FIG. 26.

DESCRIPTION OF EMBODIMENTS

Hereinafter, the embodiments of the present technique are described with reference to the drawings.

The description is given in the following order.

1. First embodiment (Example of adjusting exposure period based on counted value)
2. Second embodiment (Example of adjusting exposure period, and performing exposure in each division)
3. Third embodiment (Example of adjusting exposure period, and reading pixels by two reading circuits)
4. Fourth embodiment (Example of adjusting exposure period, and reading pixels by four reading circuits)
5. Fifth Embodiment (Example of sharing one scintillator by a plurality of pixel array portions, and adjusting exposure period)
6. Sixth Embodiment (Example of adjusting exposure period, and performing exposure by providing non-exposure period by local shutter system)
7. Seventh embodiment (Example of adjusting exposure period, and performing exposure by providing non-exposure period by global shutter system)

1. First Embodiment

Figure 4:
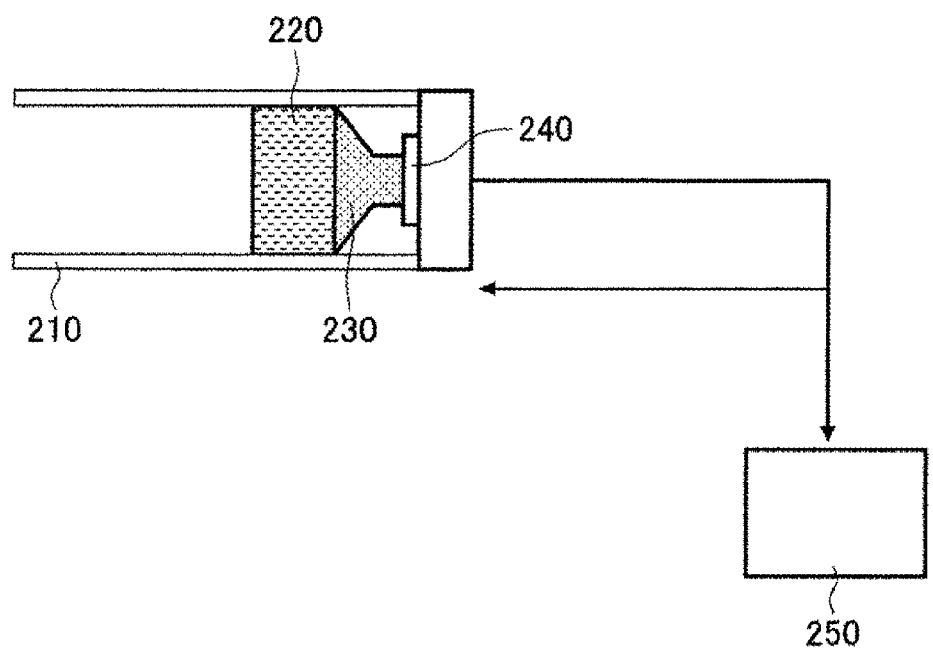
FIG. 4 is a view illustrating a configuration example of a radial ray detector according to a first embodiment.

FIG. 4 is a view illustrating a configuration example of a radial ray detector to which the present technique is applied.
[Configuration Example of Radial Ray Detector]
A radial ray detector 200 of FIG. 4 has a collimator 210, a scintillator 220, a light guide 230, an image pickup device 240, and a digital processing apparatus 250.

In the radial ray detector 200, the collimator 210 is formed using lead and the like. The scintillator 220 receives radial rays through the collimator 210 to emit scintillation light. The light guide 230 collects scintillation light, and guides the corrected light to the image pickup device 240. The light guide 230 has a light uniformizing function, and thus the scintillation light is almost uniformized to be emitted to a light receiving surface of the image pickup device 240. The details of the configuration of the image pickup device 240 are described later with reference to FIG. 6. The light receiving surface contains a plurality of pixel arrays, and is divided into a plurality of regions, so that exposure is performed in a cyclical manner. Then, output values of the pixels in each region are output one by one as digital data. The digital processing apparatus 250 receives the output values, and then acquires the measurement results of the light intensity of exposed regions. The digital processing apparatus 250 performs energy discrimination of radial rays based on each light intensity result and also counts the number of times of the generation of significant data, and then performs photon counting of the radial rays.

By arranging a large number of such detectors in the shape of an array, the present technique can be used for a SPECT device, a PET device, a transmission X-ray detector, such as a mammography, a CT device, and the like.

Figure 5:
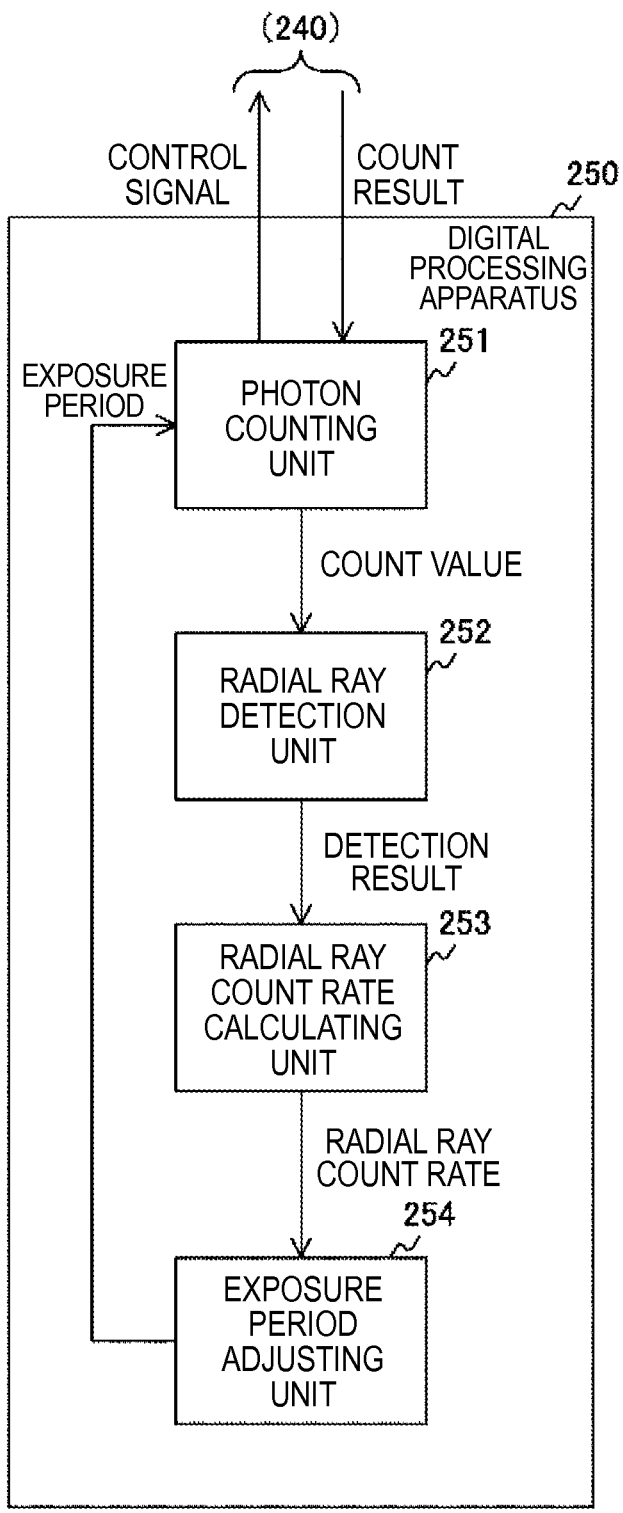
FIG. 5 is a view illustrating one configuration example of a digital processing apparatus in the radial ray detector of FIG. 4.

The image pickup device 240 and the digital processing apparatus 250 in FIG. 4 are used as a radial ray photodetector.
[Configuration Example of Digital Processing Apparatus]
FIG. 5 is a view illustrating one configuration example of the digital processing apparatus 250 in the radial ray detector of FIG. 4. The digital processing apparatus 250 has a photon counting unit 251, a radial ray detection unit 252, a radial ray count rate calculating unit 253, and an exposure period adjusting unit 254.

The photon counting unit 251 counts, in each of the plurality of regions, the number of photons of scintillation light supplied to pixels in the region. For example, when a photon is made to enter a pixel, the pixel outputs a signal of "1", and when a photon does not enter, the pixel outputs a signal of "0". Therefore, the photon counting unit 251 can count the total output value as the number of photons. The photon counting unit 251 causes the image pickup device 240 to perform exposure by a control signal, and then, whenever any one of the regions is exposed, determines the counted value in the region from the output values of the pixels. The photon counting unit 251 supplies the measured value of each region to the radial ray count rate calculating unit 253 as a measurement result of the light intensity of the scintillation light.

The radial ray detection unit 252 detects whether or not the radial ray is made to enter in each exposure period. The radial ray detection unit 252 detects whether or not a radial ray exceeding a predetermined energy enters in the exposure period based on whether not the counted value is higher than the fixed value. Furthermore, the radial ray detection unit 252 counts the number of the radial rays from the detection results of the radial rays in each exposure period, and then outputs the counted value of the radial rays to the outside as required. Moreover, the radial ray detection unit 252 supplies the detection results in each exposure period to the radial ray count rate calculating unit 253.

The radial ray count rate calculating unit 253 calculates the radial ray count rate from the detection results of the radial rays of each region. Specifically, the radial ray count rate calculating unit 253 calculates a value obtained by dividing the number of times that the radial ray is made to enter by the number of times of the exposure as the radial ray count rate (in other words an incident frequency of the radial rays). The photon counted value of the scintillation light in each exposure reflects the energy of the counted radial ray particles. Therefore, when the incident frequency of the scintillation light having light intensity higher than the fixed intensity is higher, the incident frequency of the radial ray particles exceeding a predetermined energy is higher, and thus the radial ray count rate shows a higher value. When the exposure period is longer, the number of the radial rays which are made to enter in the period becomes larger. Therefore, when the exposure period is longer, the radial ray count rate shows a higher value. The radial ray count rate calculating unit 253 supplies the calculated radial ray count rate to the exposure period adjusting unit 254.

The exposure period adjusting unit 254 adjusts the exposure period based on the radial ray count rate. When the radial ray count rate is higher than an upper limit L1, the exposure period adjusting unit 254 judges that the adjustment of the exposure period is not completed, and then shortens the exposure period. This is because when the radial ray count rate is excessively high, it is judged that the radial rays are made to enter by a plurality of times in the exposure period, and thus exact calculation cannot be performed.

On the other hand, when the radial ray count rate is lower than a lower limit L2 (L2 is a real number smaller than L1), the exposure period adjusting unit 254 judges that the adjustment of the exposure period is not completed, and then lengthens the exposure period. This is because when the radial ray count rate is excessively low, it is judged that radial rays exceeding a predetermined energy are not made to enter the region in the exposure period, in other words, sufficient energy resolution is not obtained.

The exposure period adjusting unit 254 supplies the lengthened/shortened exposure period to the photon counting unit 251 when the adjustment is not completed. The photon counting unit 251 subjects each region to exposure again over the supplied exposure period. When the adjustment is completed, the exposure period adjusting unit 254 fixes the exposure period and does not perform the following adjustment. The exposure period adjusting unit 254 may continuously acquire the radial ray count rate even after the adjustment is completed, and then may continuously perform the adjustment of the exposure period.

The radial ray detection unit 252 does not output the counted value of the radial rays while the adjustment the exposure period is not completed, and outputs the same after the adjustment is completed.

[Configuration Example of Image Pickup Device]

Figure 6:
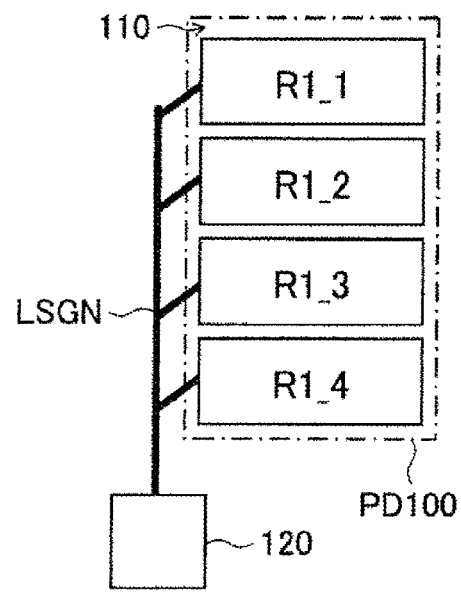
FIG. 6 is a view illustrating a configuration example of an image pickup device in the radial ray detector of FIG. 4.
Figure 7:
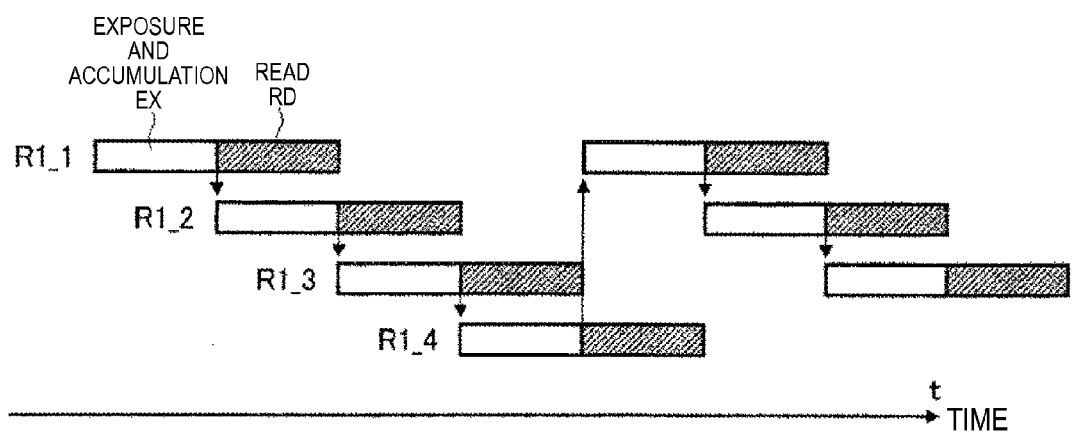
FIG. 7 is a view showing an example of exposure and accumulation and reading timing of each divided region in the radial ray detector of FIG. 6.

FIG. 6 is a view illustrating a configuration example of an image pickup device in the radial ray detector of FIG. 4. FIG. 7 is a view showing an example of exposure and accumulation and reading timing of each divided region in the radial ray detector of FIG. 6.

An image pickup device 240 of FIG. 6 shows the basic concept of the image pickup device in the radial ray detector according to this embodiment. In the image pickup device 240, basically, a light receiving surface (light receiving unit) containing an array of a plurality of pixels PXL is divided into a plurality of regions, a fixed exposure period independent in each region is allocated, and exposure is performed at almost the same interval and in a cyclical manner, whereby the time resolution of photodetection is dramatically increased.

In FIG. 6, PD100 denotes the light receiving surface (light receiving unit), 110 denotes a pixel array portion, 120 denotes a detector circuit (detection judging circuit), and CTL100 denotes a control unit. In the image pickup device 240 of FIG. 6, the pixel array portion 110 of the single light receiving surface PD100 is divided into N regions (herein N=4) R1_1 to R1_4. Herein, an independent fixed exposure period is allocated to each of the regions R1_1 to R1_4, and the regions are exposed one by one in a cyclical manner. In this process, the exposure time of the divided regions R1_1 to R1_4 of the light receiving surface PD100 is 1/N and the effective sensitivity of the light receiving surface PD100 is also 1/N.

On the other hand, the photodetection is divided on time basis in each region, and an output signal of each of the regions R1_1 to R1_4 reflects the quantity of light entering the light receiving surface PD100 in each exposure period. More specifically, the time resolution increases by N times.

The output signals of the accumulated charges in each of the regions R1_1 to R1_4 are read by the common detection judging circuit 120 through a signal line LSGN. The exposure and accumulation period of each of the regions R1_1 to R1_4 is started by reset operation of discharging the accumulated charges of each region.

These operations are somewhat similar to an electronic shutter of a CMOS imager and can be performed by the same circuit configuration in some cases. However, the operations are essentially different from each other in the respect that the electronic shutter in the common CMOS imager aims at light quantity adjustment but the present technique aims at improving the time resolution.

There are the following differences in the specific operation and the configuration. The single light receiving surface PD100 is divided into the plurality of regions R1_1 to R1_4, and the output of each of the regions R1_1 to R1_4 reflects the quantity of the light entering the light receiving surface PD100. Exposure EX in each of the regions R1_1 to R1_4 is performed at almost the same interval and in a cyclical manner. More specifically, there are no restrictions corresponding to a frame period as in a common imager, and the same interval is maintained also when the exposure period returns from the region R1_4 to the region R1_1, for example. During the period, a blank period is not provided or scanning of shielding pixels is not performed. As a result, only a partial region and the same number of regions (only one region in this example) are exposed to light pulses entering at an arbitrary timing. Moreover, although an exact exposure complete timing in the reading cycle is hardly focused in the common CMOS imager, it is desired in the present technique that, for example, the end of the exposure and accumulation EX of the region R1_1 and the start of the exposure and accumulation EX of R1_2 are almost simultaneously performed. The description therefor is given later.

Moreover, the present technique also has a feature of applying such a basic concept to scintillation detection of radial rays and achieving energy discrimination and photon count thereof.

In this case, it is desired that light emitted to the light receiving surface is uniform in order for the photodetection amount of each of the regions R1_1 to R1_4 correctly reflects the photodetection amount of the corresponding light receiving surface PD100 and the light receiving surface PD100 may be provided with a light uniformizing unit. The light uniformization is performed by scattering light in a multiplex manner, for example. For example, integrated lenses, such as a kaleidoscope using reflection and a fly lens covered with small lenses, Digital Optics Elements (DOE) employing diffraction, light scattering materials in which particles and dots which scatter light are added to glass and resin, and the like are used.

When incident light is relatively strong, a pixel may be the same as that of a common CMOS image sensor. However, when detecting weak gamma rays as in the SPECT, the pixel is desirably a digital pixel having an internal amplifying function and high conversion efficiency and outputting the incident photon number with a digital value.

The radial ray detector according to the present technique follows the circuit architecture of a CMOS type image sensor and dramatically increases the time resolution of photodetection thereof. Thus, the energy discrimination and the photon counting are achieved in the scintillation detection of radial rays and further the detection results can be digitally output from the device. Therefore, an external device handling an analog signal is not required and the size and the cost of devices can be dramatically reduced in a gamma camera, a PET, a CT device, a mammography, and the like.

Thus, the basic concept of the radial ray detector according to this embodiment is described. Hereinafter, specific embodiments of the image pickup device (detection element) in the radial ray detector in the present technique are described. The following embodiment first describes a CMOS imager of a photon counting system. Next, a description of a new operation mode serving as the point of the present technique is given, and further a description of a radial ray detector employing the same is given. In the photon counting system, noises generated by a sensor itself are filtered, and the Signal to Noise ratio (S/N ratio) of signals increases to reach the limit. Therefore, even when the present technique is adopted to reduce the effective sensitivity, a sufficient S/N ratio can be secured, and therefore the system is suitable for scintillation detection and the like of a very slight amount of gamma rays. On the other hand, when the light emission intensity of a detection target is high and supersensitivity is not required, a common CMOS image sensor may be used.

[Configuration Example of Pixel]

Figure 8:
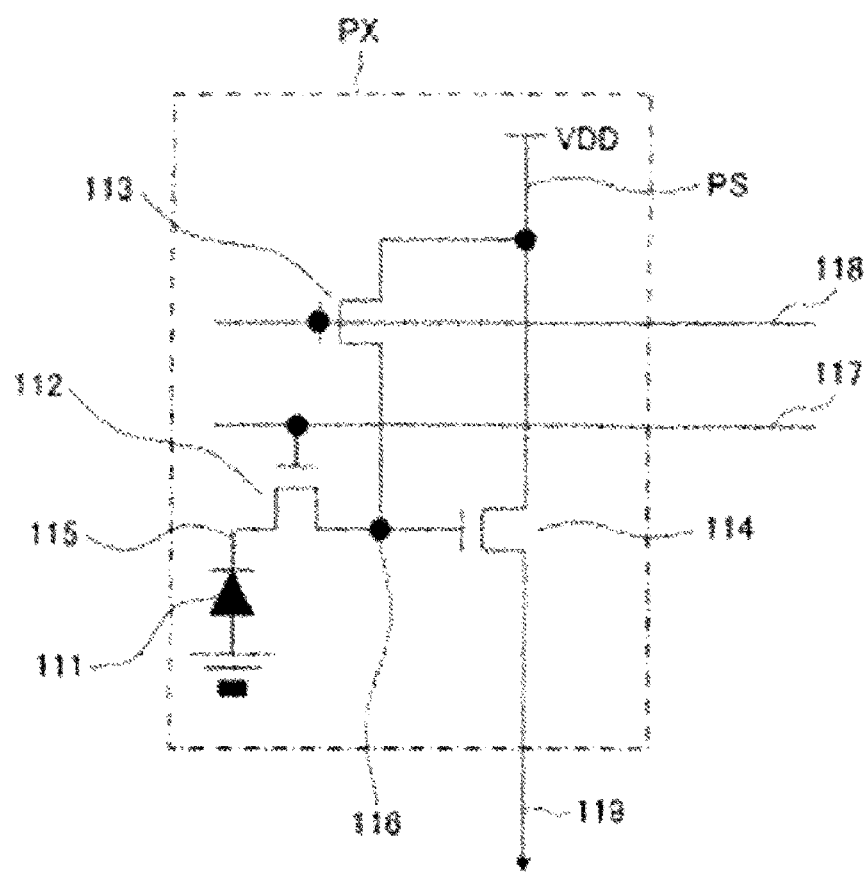
FIG. 8 is a view illustrating one example of the circuit configuration of pixels of a semiconductor image pickup chip applicable to the present technique.

FIG. 8 is a view illustrating one example of the circuit configuration of a pixel of a semiconductor image pickup chip applicable to the present technique. FIG. 8 illustrates one example of a pixel circuit containing three transistors in one unit pixel PX.

The one unit pixel PX has a photodiode 111 as a photoelectric conversion element, a transfer transistor 112, a reset transistor 113, and an amplifier transistor 114 as an amplifier element. The pixel PX has an accumulation node 115 and a detection node (FD: Floating Diffusion, floating diffusion layer) 116. A gate electrode of the transfer transistor 112 is connected to a transfer line 117 and a gate electrode of the reset transistor 113 is connected to a reset line 118. A gate electrode of the amplifier transistor 114 is connected to the detection node 116 and a source of the amplifier transistor 114 is connected to an output signal line 119 (LSGN). The FD node 116 functions as an input node of the amplifier transistor 114.

In the pixel PX, light entering a silicon substrate of the pixel generates a pair of an electron and a hole, and the electron thereof is accumulated in the node 115 by the photodiode 111. The electrons are transmitted to the detection node 116 by switching the transfer transistor 112 ON at a predetermined timing to drive a gate of the amplifier transistor 114. Thus, a signal charge becomes a signal to the output signal line 119 to be read. The reset transistor 113 is switched ON simultaneously with the transfer transistor 112 in a parallel manner to thereby extract the electrons accumulated in the photodiode 111 to a power supply, and resets the pixel to a dark state before accumulation, i.e., a state where photons do not enter. In FIG. 8, PS denotes a power supply for use in resetting or a source follower, and, for example, 3 V is supplied to the power supply PS.

With respect to the reading of the pixel, the reset transistor 113 is first switched ON and then OFF to reset the detection node 116, and then first reading is performed. A judging circuit which is not illustrated in the figure stores the output signal as a charge. Furthermore, the transfer transistor 112 is switched ON and then OFF to completely transmit the accumulated charges of the node 115 to the detection node 116, and then second reading is performed. The judging circuit extracts a difference therebetween by so-called correlation double sampling (CDS), and acquires a net pixel signal.

The basic circuit and the operation mechanism of such a pixel are the same as those of the pixel in the common CMOS imager and include various variations. However, the pixel supposed in the present technique is designed so that the conversion efficiency is remarkably high as compared with a common pixel. To that end, the parasitic capacitance of the input node 116 of the amplifier constituting the source follower is designed to effectively decrease to reach the limit. The design is achieved by various designs of the layout, techniques of feed-backing an output of the source follower to a circuit in a pixel described in Patent Literature (JP 5-63468A) and Patent Literature (JP 2011-119441A), and the like. Thus, when an output signal to a vertical signal line 119 obtained from a single photon is sufficiently larger than a random noise of the amplifier transistor 114, a signal from the pixel is quantized, so that the number of the accumulated photons of the pixel can be detected as a digital signal.

For example, when the conversion efficiency is increased to 600 μV/e−, the signal amount becomes sufficiently larger than the random noise of the amplifier transistor 114, and therefore detection of a single photon is theoretically achieved. Herein, when the presence or absence of the photon incidence during the unit exposure period is subjected to binary judgment, and the result is digitally output, a noise after the amplifier can be set to substantially zero. For example, when such a judgment is performed for a 128×128 pixel array, and the pixel array is treated as one light receiving surface, photocounting up to 128×128=16,384 photons at the maximum can be achieved.

Or, an output to the photon incidence from 0 piece to 2 pieces may be discriminated as a digital output taking three values of 0 to 2 to be counted in each exposure. In this case, although a judgment margin, i.e., an error rate in judgment, becomes strict, the dynamic range of the photon count expands.

Photoelectric conversion of a semiconductor is a quantized phenomenon in which one electron originally generates per photon incidence. A common image pickup device accumulates a large number of electrons in a photodiode, and then outputs the same as an analog signal, and therefore various noises are mixed in transmission in a later stage. However, when the pixel outputs the number of the generated electrons as a digital signal as it is, and then the digital signal is processed without an error in a later stage, therein is no room for the mixing of noises during transmission.

In the example described above, a signal amount which allows single photon detection is obtained by an increase in the conversion efficiency due to the decrease in the parasitic capacitance but the same effect is obtained even when electrons obtained by photoelectric conversion are multiplied in the pixel, for example. For example, Patent Literature (JP 2008-35015A) proposes a structure in which a plurality of stages of CCD multiplier transfer line elements are embedded between the photodiode and an amplifier input node in the pixel. Also by multiplying the photoelectrically converted electrons by about 10 times in the pixel using such a technique and the like, single photon detection can be achieved and a semiconductor image pickup chip having the same function can be constituted.

[Configuration Example of Detection Judging Circuit]

Figure 9:
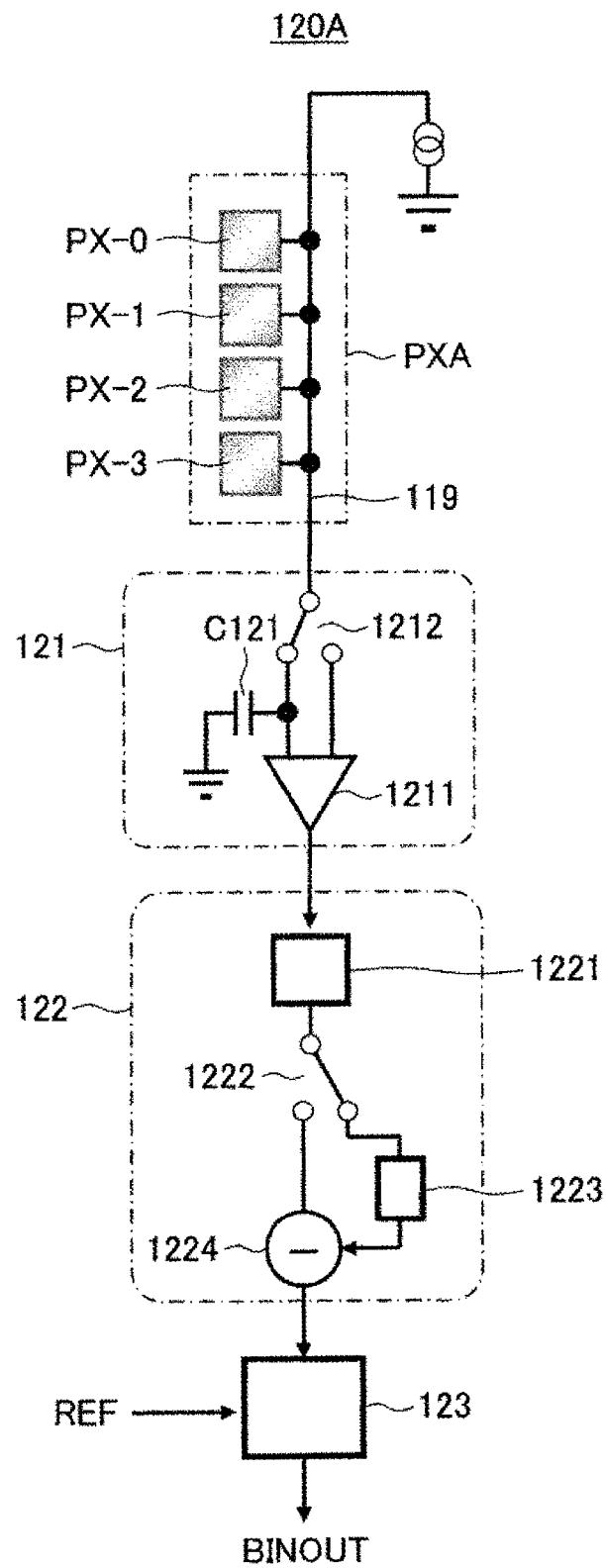
FIG. 9 is a view illustrating a configuration example of a detection judging circuit (sensing circuit) which detects a minute output signal from pixels, and performs binary judgment of the presence or absence of photon incidence.

FIG. 9 is a view illustrating a configuration example of a detection judging circuit (sensing circuit) which detects a minute output signal from a pixel, and performs binary judgment of the presence or absence of photon incidence.

In FIG. 9, in a pixel array PXA, the pixels PX-0 to PX-3 in the present technique illustrated in and after FIG. 6 is connected to the same output signal line 119 through a selection transistor (whose description is omitted), for example. Each of the pixels PX-0 to PX-3 outputs the presence or absence of photon incidence in an exposure and accumulation period as a digital signal.

A detection judging circuit 120A of FIG. 9 contains an analog CDS circuit (ACDS) 121, a digital CDS circuit (DCDS) 122, and a digital comparator (DCMP) 123. The analog CDS circuit 121 has an operational amplifier (operational amplifier) 1211, a switch 1212, and a capacitor C121. The digital CDS circuit 122 has an AD (analog digital) converter (ADC) 1221, a switch 1222, a register (RES) 1223, and a subtracter 1224.

The analog CDS circuit (ACDS) 121 samples/holds a reset signal of a pixel to a reference voltage side of the operational amplifier 1211 with gain 1, for example, to thereby hold a charge which offsets the reset signal of the pixel. The output reflects a difference between an input signal and a reset signal of the analog CDS circuit (ACDS) 121 and, when the input is a reset signal, the output is a no-signal.

In the next stage of the analog CDS circuit (ACDS) 121, the digital CDS circuit (DCDS) 122 containing the A/D converter (ADC) 1221 of high resolution is disposed. The digital CDS circuit (DCDS) 122 is a circuit which cancels the offset variation on the detector circuit side by digital processing with respect to a minute pixel signal. A pure pixel signal appears with digital gradation in the output.

The final stage is the digital comparator (DCMP) 123. A digital signal which is an output of the digital CDS circuit 122 is compared with a reference signal REF, and then binary judgment of the presence or absence of photon incidence is performed. The analog CDS circuit 121, the digital CDS circuit 122, and the digital comparator 123 are shared by a plurality of pixels.

[Operation Example of Sensing Circuit]

Figure 10:
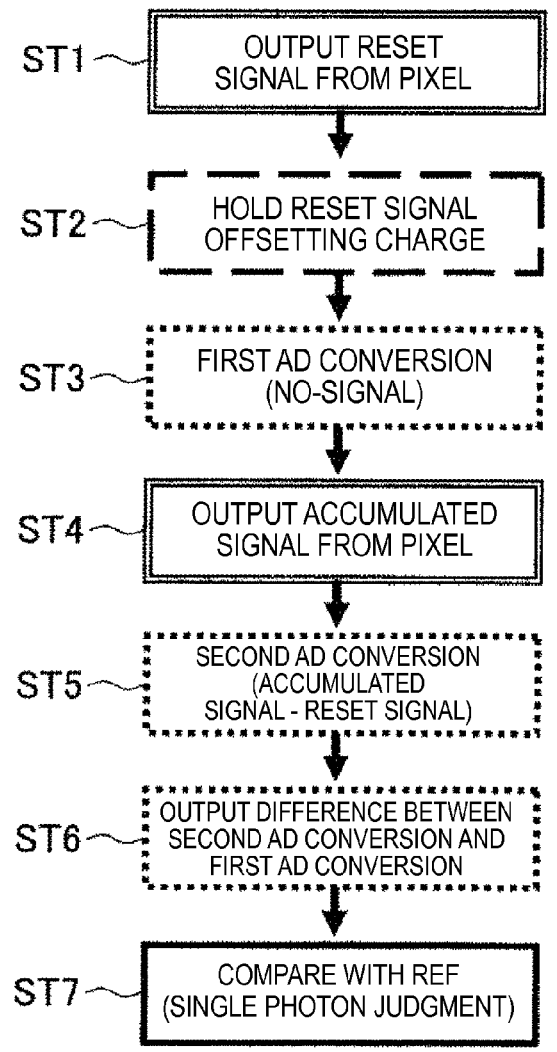
FIG. 10 is a flow chart showing a signal reading procedure of the sensing circuit of FIG. 9.

FIG. 10 is a flow chart showing a signal the reading procedure of the sensing circuit of FIG. 9. The following procedures are performed in the signal reading.

(Step ST1)

First, in Step ST1, an amplifier input node 116 of a selected pixel is reset, and a reset signal is output to the output signal line 119.

(Step ST2)

In Step ST2, the reset signal is sampled/held by the analog CDS circuit (ACDS) 121. In this step, the analog CDS circuit (ACDS) 121 outputs a no-signal, and the no-signal is input into the digital CDS circuit (DCDS) 122.

(Step ST3)

Herein, in Step ST3, the A/D converter (ADC) 1221 performs first AD conversion, and then latches the result to the register (RES) 1223 through the switch 1222. The result is one obtained by digitally detecting an offset variation of the A/D converter (ADC) 1221 itself.

(Step ST4)

Next, in Step ST4, signal charges accumulated in the photodiode 111 of the pixel are transmitted to the input node 116 of the amplifier transistor 114, and then the pixel outputs accumulated signals. In this step, the analog CDS circuit (ACDS) 121 outputs a difference between the accumulated signals and the reset signal, i.e., a net accumulated signal.

(Step ST5)

In Step ST5, the A/D converter (ADC) 1221 performs second AD conversion herein.

(Step ST6)

In Step ST6, a difference value obtained by subtracting the digital value of Step ST3 from the digital value of Step ST5 is output from the digital CDS circuit (DCDS) 122.

Thus, an offset component contained in the A/D converter (ADC) 1221 is also canceled, and then only the net pixel accumulated signal is output with digital gradation.

(Step ST7)

In Step ST7, the digital comparator (DCMP) 123 compares the output of the digital CDS circuit 122 with a reference signal REF. The reference signal REF is set near the intermediate value of a single-photon signal. When the pixel signal exceeds the value, a signal "1" is output as "Photon entered" to BINOUT and when the pixel signal is equal to less than the value, a signal "0" is output as "No photon entered" to BINOUT.

When two reference signals REF are prepared in the digital comparator (DCMP) 123, and one is set to the intermediate value of a single-photon signal and the other is set to the intermediate value of a single-photon signal and a two-photon signal, the determination of three values of "0", "1", and "2" is achieved. Thus, the dynamic range of imaging improves. Since the multi-value determination is affected by a conversion efficiency variation and the like in each pixel, manufacturing accuracy higher than binary judgment is required. However, the judging of the pixel signal as a digital output is the same as that of the binary judgment, and noises during transmission in connection with an analog output are completely removed.

[Operation Example of Digital Processing Apparatus]

(Step ST901)

Figure 11:
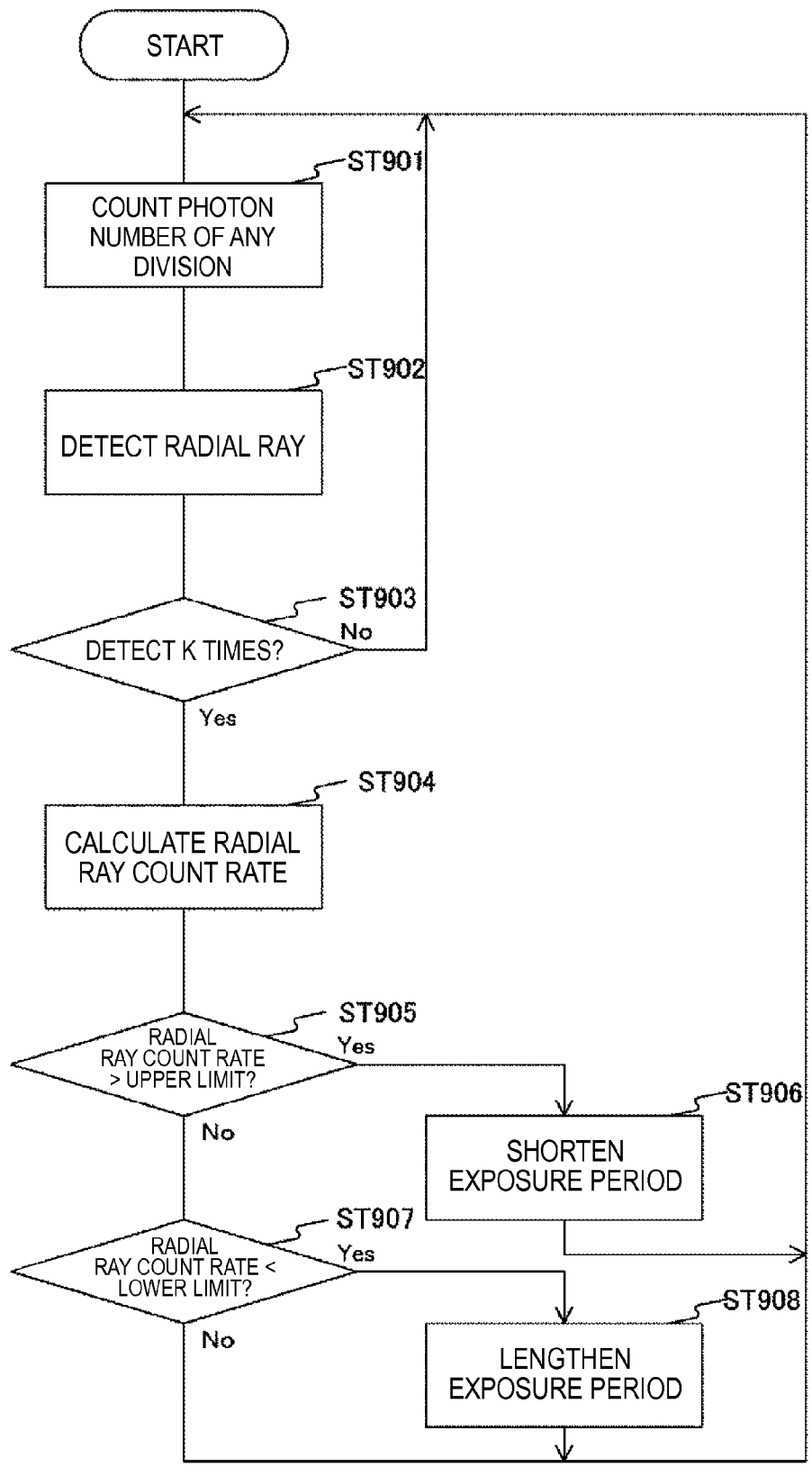
FIG. 11 is a flow chart showing the operation of the digital processing apparatus of FIG. 5.

FIG. 11 is a flow chart showing the operation of the digital processing apparatus of FIG. 5. The operation is started when a power supply is supplied to the radial ray detector, for example. The digital processing apparatus 250 subjects only any one of the divisions to exposure, and then counts the number of photons in the division (Step ST901).

(Step ST902)

The digital processing apparatus 250 detects whether or not radial rays enter in the exposure period based on whether or not the photon counted value larger than a fixed value Cp is acquired. When the adjustment of the exposure period is completed, the digital processing apparatus 250 outputs the counted value of the radial rays obtained from the radial ray detection result (Step T902).

(Step ST903)

The digital processing apparatus 250 judges whether or not the incidence of the radial rays is detected K (K is an integer equal to or larger than 2) times (Step ST903). When the incidence is not detected K times (Step ST903: No), the digital processing apparatus 250 returns to Step ST901. The K value is "64", for example. When the image pickup device 240 is divided into four regions, the regions each are exposed 16 times, so that 64 times of exposure in total is performed.

(Step ST904)

When the incidence is counted K times (Step ST903: Yes), the digital processing apparatus 250 calculates a value obtained by dividing the number of times that the radial rays enter by K as the radial ray count rate (Step ST904).

(Steps ST905 and ST906)

The digital processing apparatus 250 judges whether or not the radial ray count rate is higher than the upper limit L1 (Step ST905). When the radial ray count rate is higher than the upper limit L1, (Step ST905: Yes), the digital processing apparatus 250 shortens the exposure period by a fixed period of time (Step ST906). After Step ST906, the digital processing apparatus 250 returns to Step ST901. Although the digital processing apparatus 250 shortens the exposure period by a fixed period of time, the exposure period may be shortened according to a difference between the upper limit L1 and the radial ray count rate.

(Steps ST907 and ST908)

When the radial ray count rate is equal to or lower than the upper limit L1, (Step ST905: No), the digital processing apparatus 250 judges whether or not the radial ray count rate is lower than the lower limit L2 (Step ST907). When the radial ray count rate is lower than the lower limit L2 (Step ST907: Yes), the digital processing apparatus 250 lengthen the exposure period by a fixed period of time (Step ST908). After Step ST907, the digital processing apparatus 250 returns to Step ST901. When the radial ray count rate is equal to or higher than the lower limit L2 (Step ST907: No), the digital processing apparatus 250 judges that the adjustment of the exposure period is completed, and then returns to Step ST901. Although the digital processing apparatus 250 lengthens the exposure period by a fixed period of time, the exposure period may be lengthened according to a difference between the lower limit L2 and the radial ray count rate.

Herein, the range from the lower limit L2 to the upper limit L1 which can be regarded as the optimal exposure may be set according to the intended use. For example, it is supposed that radial rays enter an image pickup device at random in each exposure period.

Under such conditions, the relationship between the average number of the radial rays which are made to enter in the exposure period (Average incident number) and the probability (Radial ray count rate) that the incident radial rays are counted follows the Poisson distribution. When following the Poisson distribution, the relationship between the average incident number and the radial ray count rate establishes the relationship shown in the following expression 1.

[Expression 1]

$$P(k) = \frac{\lambda^k e^{-\lambda}}{k!}$$  Expression 1

In Expression 1, P(k) is the probability that the radial ray incidence occurs k times in the exposure period, $\lambda$ is the average number of the radial rays (i.e., Average number of incident rays) which are made to enter an image pickup device in the unit exposure period, and e is the base ($\approx$2.718) of natural logarithms.

Herein, the relationship between the average number of incident rays and the radial ray count rate is described supposing that the average incident number $\lambda$ is "0.21." In this case, the relationship between the number of times of incidence of radial rays k and the probability P(k) is as follows based on Expression 1 described above.
Probability of radial ray incidence of 0 time (k=0): 0.8105
Probability of radial ray incidence of 1 time (k=1): 0.1702
Probability of radial ray incidence of 2 times (k=2): 0.0179
Probability of radial ray incidence of 3 times (k=3): 0.0013
. . . (Since the value becomes very small (0.00007 or less), the following values are omitted.)

Herein, when the binary judgment of whether or not the radial rays enter is performed, the probability (1−0.8105≈0.19) that the radial rays enter once or more serves as the radial ray count rate.

Figure 12:
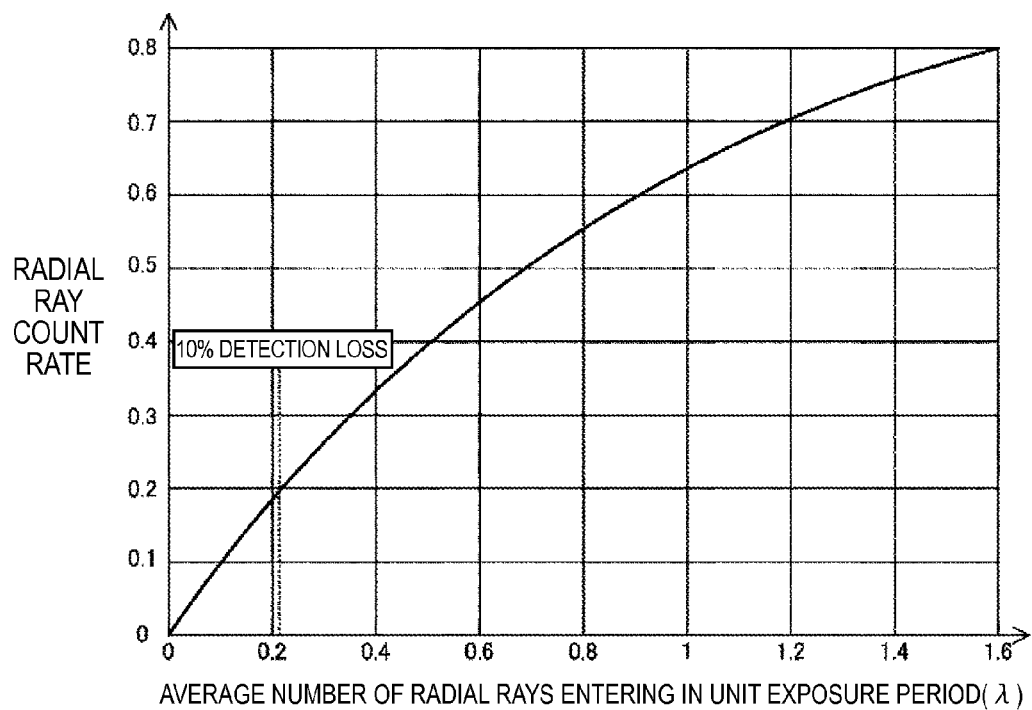
FIG. 12 is a graph showing one example of the relationship between the radial ray count rate and the average incident ray number per unit exposure period.

More specifically, when the average radial ray incident number $\lambda$ is "0.21", the radial ray count rate is "0.19", which indicates that about 90% of the radial rays are counted. One example of the relationship between the average radial ray incident number $\lambda$ and the radial ray count rate is shown in FIG. 12. In FIG. 12, the vertical axis indicates the radial ray count rate and the horizontal axis indicates the average number $\lambda$ of radial rays which enter during the unit exposure period. As shown in FIG. 12, the relationship is not linear. More specifically, when the incident frequency of the radial rays is high and $\lambda$ is large, the probability that a plurality of radial rays enter in the exposure period increases. Since the radial rays are counted as 1 by the binary judgment, counting loss increases and the count accuracy deteriorates. Therefore, the radial ray count rate can serve as an index showing the count accuracy. For example, when the radial ray count rate is 0.19 or less, it is guaranteed that about 90% or more of radial rays are counted.

For example, when the energy resolution can be considered to be already sufficient in the exposure period in Step ST901, the lower limit L2 of the radial ray count rate may be set to "0", and the digital processing apparatus 250 may perform the adjustment of only shortening the exposure period. Before the completion of the adjustment, scintillation light whose light intensity is higher than the light intensity corresponding to a fixed value Cp may be detected. After the completion of the adjustment, scintillation light whose light intensity is lower than the light intensity may be detected. In this case, after the completion of the adjustment, the fixed value Cp is updated to a value smaller than the value before the completion of the adjustment.

By providing such an adjustment mechanism, a radial ray detector can be used for a plurality of uses ranging from the detection of a very slight amount of gamma rays to imaging of transmission X-rays having high incident frequency. Moreover, also in the same radial ray detector, the trade-off between the sensitivity and the time resolution can be adjusted, and photodetection can be performed under the optimal conditions.

In a gamma camera, an X-ray mammography, a CT device, and the like in which two or more of the light receiving units illustrated in FIG. 6 are arranged to count and image radial rays, exposure may be adjusted in real time in each light receiving unit in imaging. Thus, counting and imaging of radial rays having a wide dynamic range can be achieved while correctly counting a very slight amount of radial rays. Such an exposure adjusting function can also be performed by programming various conditions, such as a counting rate range which determines a monitor exposure number and the optimal exposure of a sample monitor in a register in a semiconductor light receiving element, and then performing automatic adjustment in the element.

The present invention can be applied to a medical diagnostic apparatus and the like employing fluorescence observation in addition to radial ray counting. In the fluorescence observation, when excitation light is emitted in a pulse shape, pulse-like fluorescence generates from a phosphor. For example, in a fluorescence scanner for DNA chip or a scanner for photostimulated luminescence detection of an imaging plate, excitation light is emitted in a pulsed manner in each detection target sample or a detection target region, and then the intensity of fluorescence generated from the examination target is measured.

When the time resolution of the detection is increased employing the present invention, fluorescence detection can be performed while scanning a larger number of inspection portions at high speed corresponding to the increase, so that the observation throughput can be sharply increased. In such a scanner, the throughput may be further improved by arranging a plurality of light receiving units to perform simultaneous measurement.

2. Second Embodiment

Configuration Example of Image Pickup Device

Figure 13:
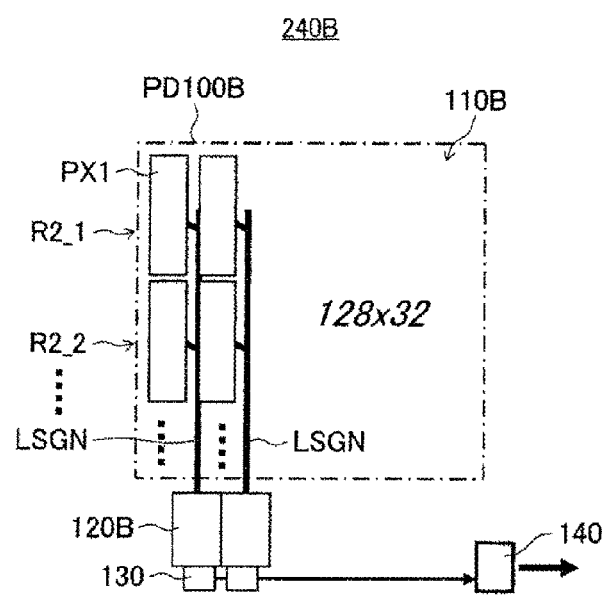
FIG. 13 is a view illustrating one example of an image pickup device in a radial ray detector according to a second embodiment.
Figure 14:
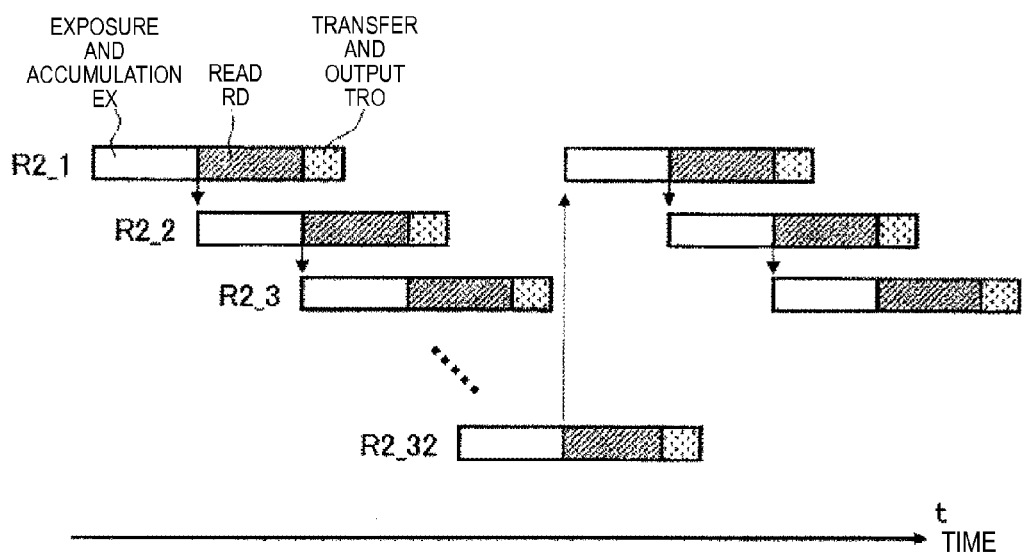
FIG. 14 is a view showing an example of exposure and accumulation and reading timing of each divided region in the radial ray detector of FIG. 13.

Next, the entire configuration of an image pickup device in a radial ray detector and an operation example employing the present technique is described as second embodiment. FIG. 13 is a view illustrating one example of an image pickup device 240B in the radial ray detector according to this embodiment. FIG. 14 is a view showing an example of exposure and accumulation and reading timing of each divided region in the radial ray detector of FIG. 13.

In an image pickup device (image pickup chip) 100B, pixels PX1 of 32 rows×128 columns are disposed in the shape of an array in a pixel array portion 110B. The pixel is a rectangle with a length-to-width ratio of about 4:1. The pixel array portion 110B is an almost square and forms a light receiving surface (light receiving unit) PD100B. Incident light detected in each pixel PX1 is accumulated in the pixel as a photoelectrically converted charge. To a detection judging circuit 120B, 32 pixels each are connected through a signal line LSGN. In reading of the pixel output to the detection judging circuit 120B, one row is selected, the outputs of 128 pixels are read in parallel into 128 detection judging circuits 120B, AD-converted, and then digitally judged. The output result of each pixel detected and judged in the detection judging circuit 120B is stored once in a register 130, transmitted to an output circuit 140 within a reading period of the next row, and then output as digital data.

Herein, the single light receiving surface PD100B is divided into regions R2_1 to R2_32 each corresponding to each row. The reading of the regions is performed one by one in a cyclical manner, and 32 times of reading complete one cycle. Herein, the exposure and accumulation of each row are started immediately after the end of the exposure and accumulation of the selected row before the currently selected row. The exposure and accumulation of the pixel are started with compulsory extraction of the accumulated charges in the photodiode as described above, i.e., reset operation. Then, the exposure and accumulation end in connection with the reading of accumulated data.

Figure 1:
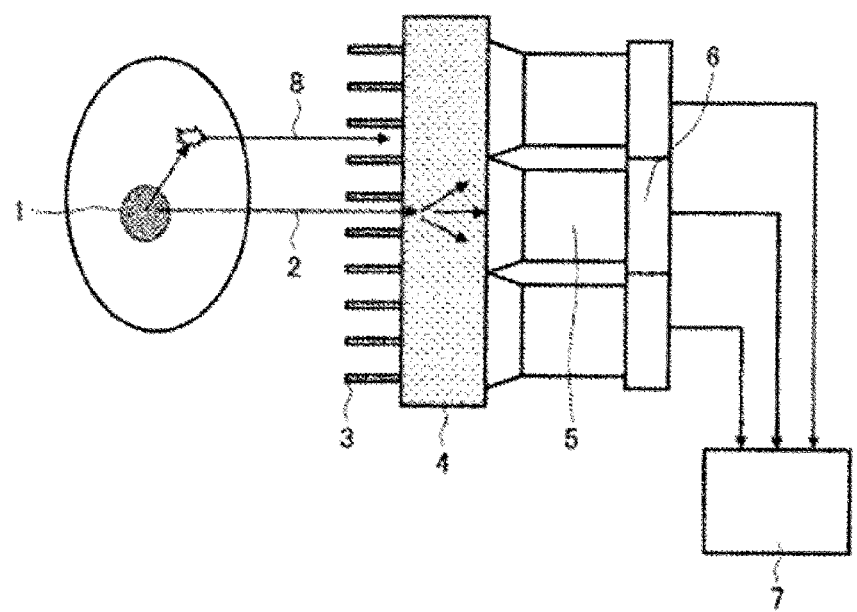
FIG. 1 is a view for explaining the outline of gamma ray detection.
Figure 2:
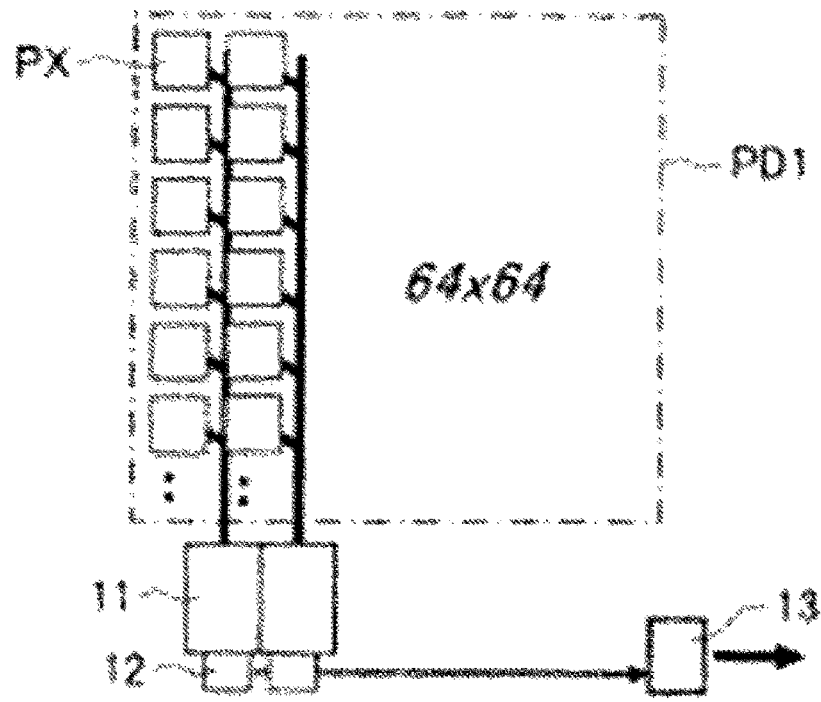
FIG. 2 is a view illustrating a general circuit configuration of a CMOS imager.
Figure 3:
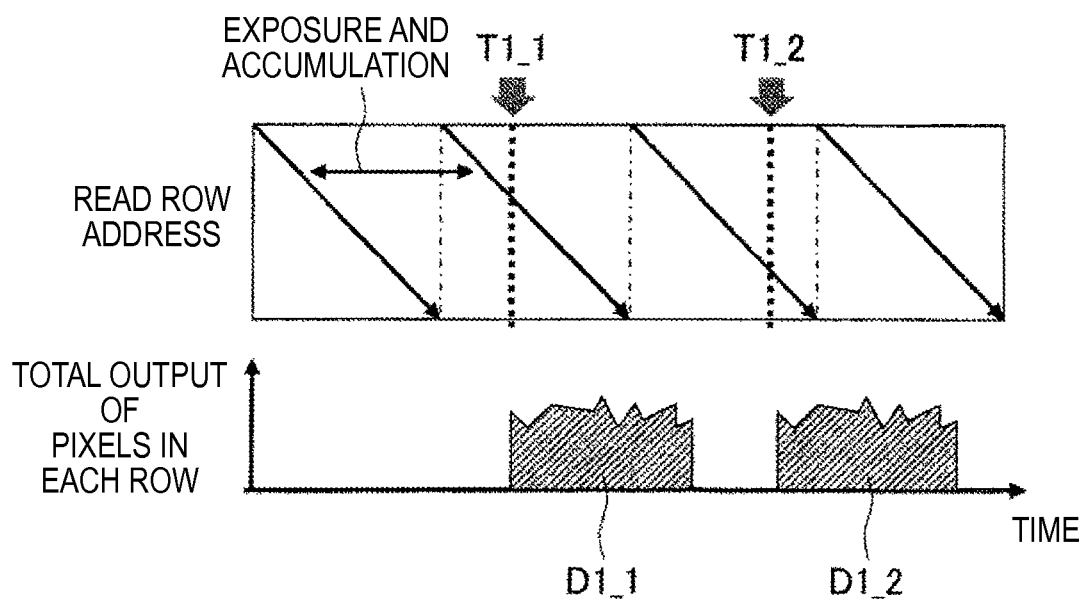
FIG. 3 includes FIGS. 3a and 3b showing the output result from each row of the CMOS imager of FIG. 2 as a total output of 64 pixels selected in each row.

Since the detection judging circuit 120B is shared by 32 rows in this embodiment, the time required for reading each pixel data specifies the minimum cycle period of each exposure and accumulation EX. For example, when the time is 5 μsec, photons entering at an interval of 5 μsec or more are certainly exposed by different rows, and then the photons are read distinctively from each other. Therefore, the time resolution of the photodetection in the image pickup device (image pickup chip) 100B is 5 μsec, and sharply increases as compared with a former example described with reference to FIG. 2.

Figure 15:
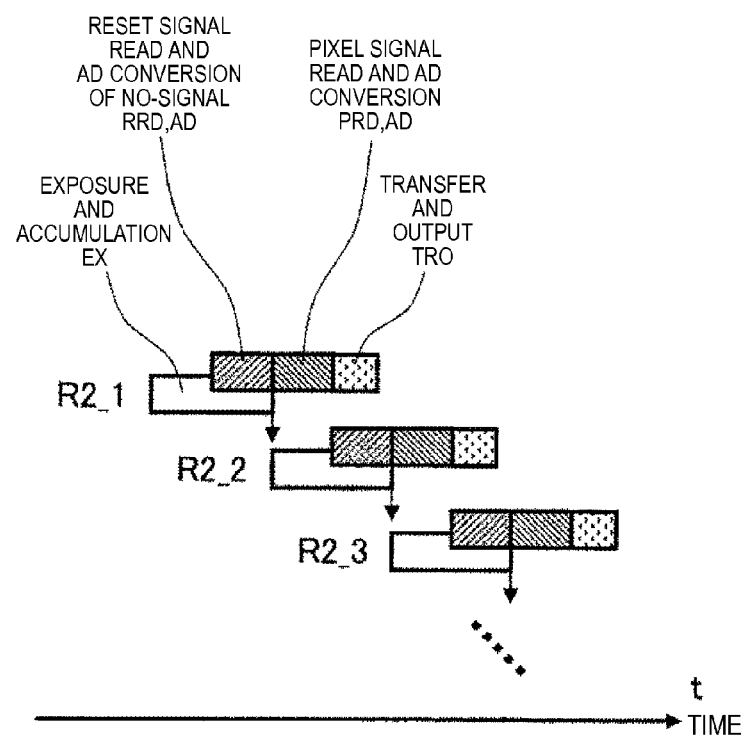
FIG. 15 is a view illustrating a more preferable example of exposure and accumulation and reading timing of each divided region in the radial ray detector of FIG. 13.

When the circuit operation shown in FIG. 9 is presumed, for example, the exact end timing of the exposure and accumulation is the timing in Step ST6 in which the accumulated charges are transmitted to the detection node from the photodiode in the reading. Therefore, the exact cycle view of the exposure and accumulation is as shown in FIG. 15. It is desirable that a photodiode of a pixel in the next exposure region is reset almost simultaneously with the transfer of the accumulated charges of the pixel in the former exposure region, and then exposure is started.

However, even when the operation of the detection judging circuit shifts as a whole as described above, the minimum cycle period does not change, and the total of the diagonally shaded portions specifies the minimum cycle period. In addition thereto, the operation of the detector circuit includes various variations, and there is a case where a pipeline is introduced into the inside, and the diagonally shaded portions limitedly overlap with each other in some cases. These states are not essential problems, and therefore the subsequent discussion is given with reference to a simple cycle view.

In the photon counting, the number of pixels in the exposure region specifies the dynamic range of detection. When each row is defined as an independent exposure region as in this example, the number of pixels is equivalent to the number of columns and is 128 herein. On the other hand, when there are 2 or more rows, the circulation operation of this example can be achieved. The exposure sensitivity decreases when the number of the rows is larger. Therefore, it is desirable in the pixel array that the number of columns is larger and the number of rows is smaller. On the other hand, when the light receiving surface PD100B is approximately square, the light receiving surface PD100B is conveniently used for arranging two or more of the light receiving surfaces PD100B in an array and the vertical resolution and the horizontal resolution are easily uniformized.

Therefore, when a photon counting system is employed, it is advantageous for the pixel PX1 of the present technique to be a rectangular pixel longitudinal in the column direction. However, the electron transfer in the photodiode requires a sufficient potential gradient. When the distance is excessively long, normal transfer cannot be achieved. Therefore, it is indispensable to divide the pixels at a fixed distance. The pixel shape needs to be determined collectively considering the above-described circumstances.

A single-photon gamma ray generated from technetium, for example, has an energy of 140 keV. It is supposed that the photon collides with a scintillator containing NaI without being scattered, and then 1500 photons enter the image pickup chip with uniform plane distribution. In this case, 1500/32 photons on average are exposed and accumulated by any one of the rows, and then the photon count result is output as a binary judgment value of each pixel.

On the other hand, the energy of the scattered gamma ray decreases, and consequently it is supposed that only 700 photons generated from the scintillator enter the chip. At this time, 700/32 photons on average are exposed and accumulated by any one of the rows, and then the photon count result is output as a binary judgment value of each pixel. The number of times of the generation of the judgment "1" in each row (herein 128 at the maximum) reflects the energy of the gamma ray.

Figure 16:
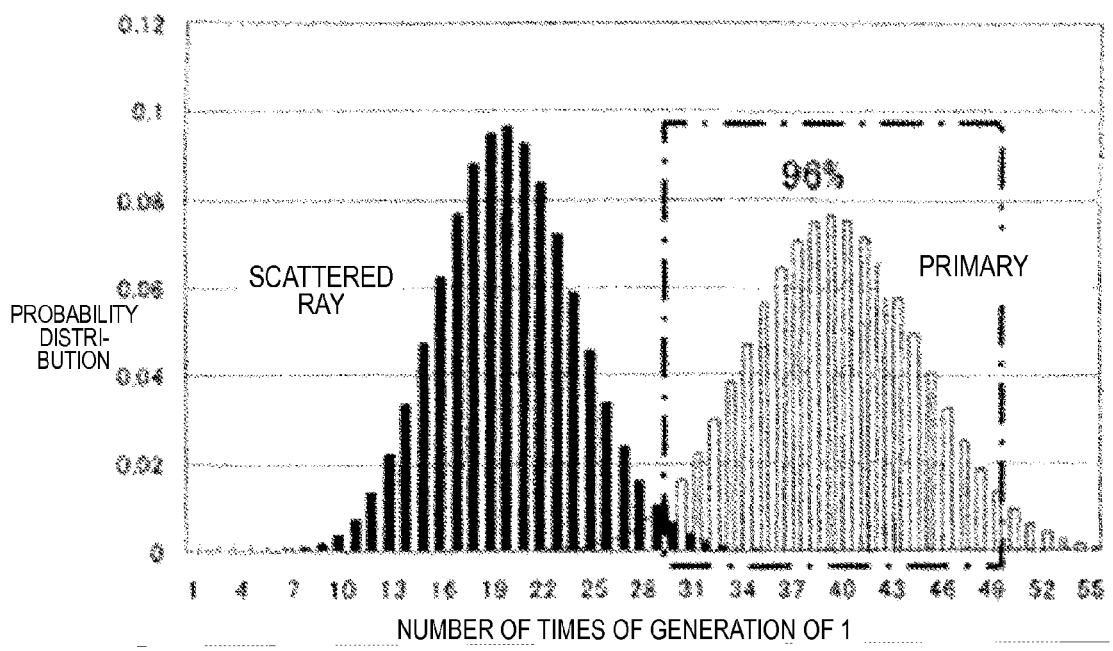
FIG. 16 is a view illustrating results of estimating the generation frequency distribution of judgment of "1" from the Poisson distribution and the binomial distribution.

FIG. 16 shows the results of estimating the generation frequency distribution of the judgment "1" from the Poisson distribution and the binomial distribution.

The scattered gamma rays and primary gamma rays which are not scattered show completely different frequency distributions, and therefore can be statistically classified. For example, when outputs in which the number of times of the generation of "1" is in the range of 29 to 49 are discriminated as primary gamma ray incidence, 96% of the actual primary gamma rays are collected and most scattered radial rays can be filtered.

More specifically, although the present technique dramatically increases the time resolution and can achieve the photon count of gamma rays, it is confirmed that even when 1/32 of sensitivity reduction occurs, the energy discrimination function is not lost.

3. Third Embodiment

Configuration Example of Image Pickup Device

Figure 17:
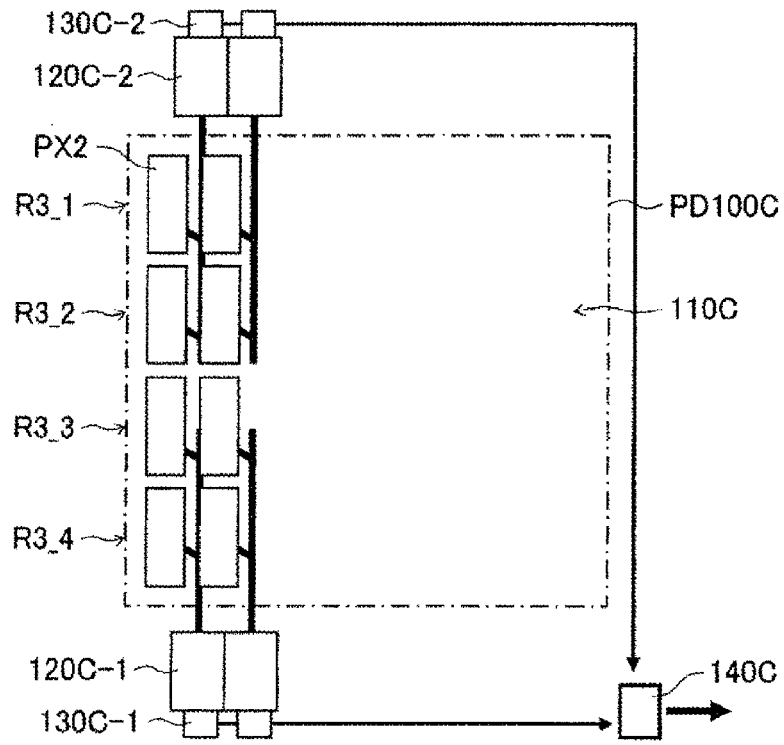
FIG. 17 is a view illustrating one example of an image pickup device in a radial ray detector according to a third embodiment.
Figure 18:
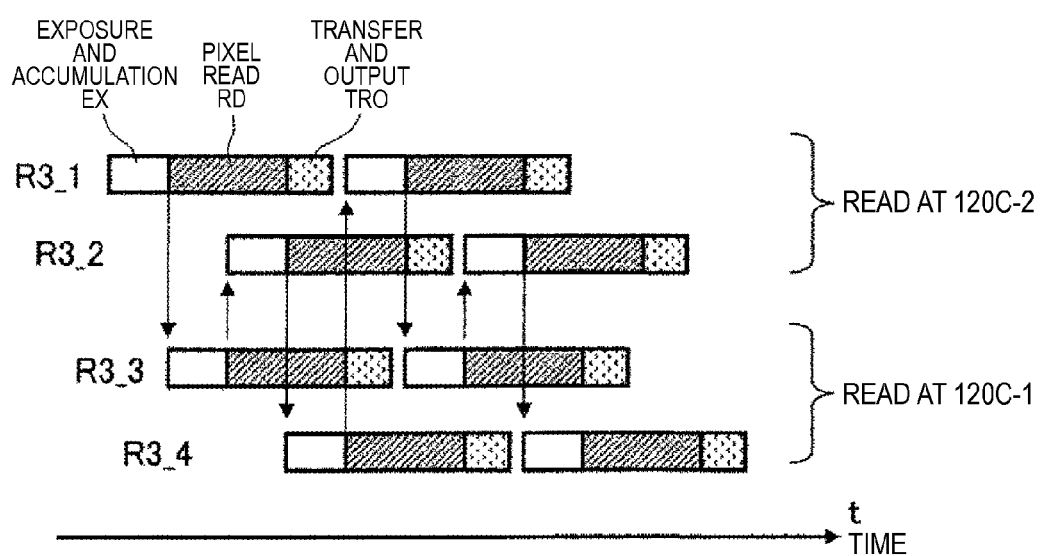
FIG. 18 is a view showing an example of exposure and accumulation and reading timing of each divided region in the radial ray detector of FIG. 17.

FIG. 17 is a view illustrating one example of an image pickup device 240C in a radial ray detector according to a third embodiment. FIG. 18 is a view showing an example of exposure and accumulation and reading timing of each divided region in the radial ray detector of FIG. 17.

The image pickup device 240C according to this embodiment further increase the time resolution by providing two detection judging circuits 120C and two registers 130C.

In a pixel array portion 110C, pixels PX2 are disposed in the shape of an array to form a light receiving surface PD100C. Herein, for simplicity, a configuration of four rows is illustrated and the light receiving surface PD100C is divided into four regions R3_1 to R3_4.

The incident light detected in each pixel is accumulated in the pixel as a photoelectrically converted charge. Two pixels are connected to each of the two detection judging circuits 120C-1, 120C-2. One row is selected in reading the pixel output to the detection judging circuits, the pixels are read in parallel into the detection judging circuits, and then the pixels are AD-converted to be digitally judged. The output result of each of the detected and judged pixels is stored once in the registers 130C-1, 130C-2, transmitted to the output circuit 140C in the next reading period of the detection judging circuits 120C-1, 120C-2, and then output as digital data.

The single light receiving surface PD100C is divided into regions R3_1 to R3_4 corresponding to each row. The regions R3_1, R3_2 are connected to the detection judging circuit 120C-2 and the regions R3_3, R3_4 are connected to the detection judging circuit 120C-1. The two detection judging circuits 120C-1, 120C-2 perform the pixel data reading operation in parallel while shifting the timing. The reading is performed in a cyclical manner in order of the regions R3_1, R3_3, R3_2, R3_4.

In the image pickup device 240B of FIG. 13 which is the second embodiment, one detection judging circuit is shared by all the divided regions. Therefore, the pixel reading needs to be serially performed by one circuit, which specifies the cycle time of the exposure and accumulation. In the third embodiment, the restrictions are canceled by using the two detection judging circuits, and causing the circuits to operate in parallel while shifting the timing, and thus the cycle time can be shortened to ½. When the detection judging circuits require 5 μsec for the pixel reading and the digital judgment, the time resolution is shortened to 2.5 μsec in this embodiment.

In this case, the exposure time of each region per cycle is ½ but the effective sensitivity does not decrease because the exposure is performed at a two-fold cycle time.

4. Fourth Embodiment

Figure 19:
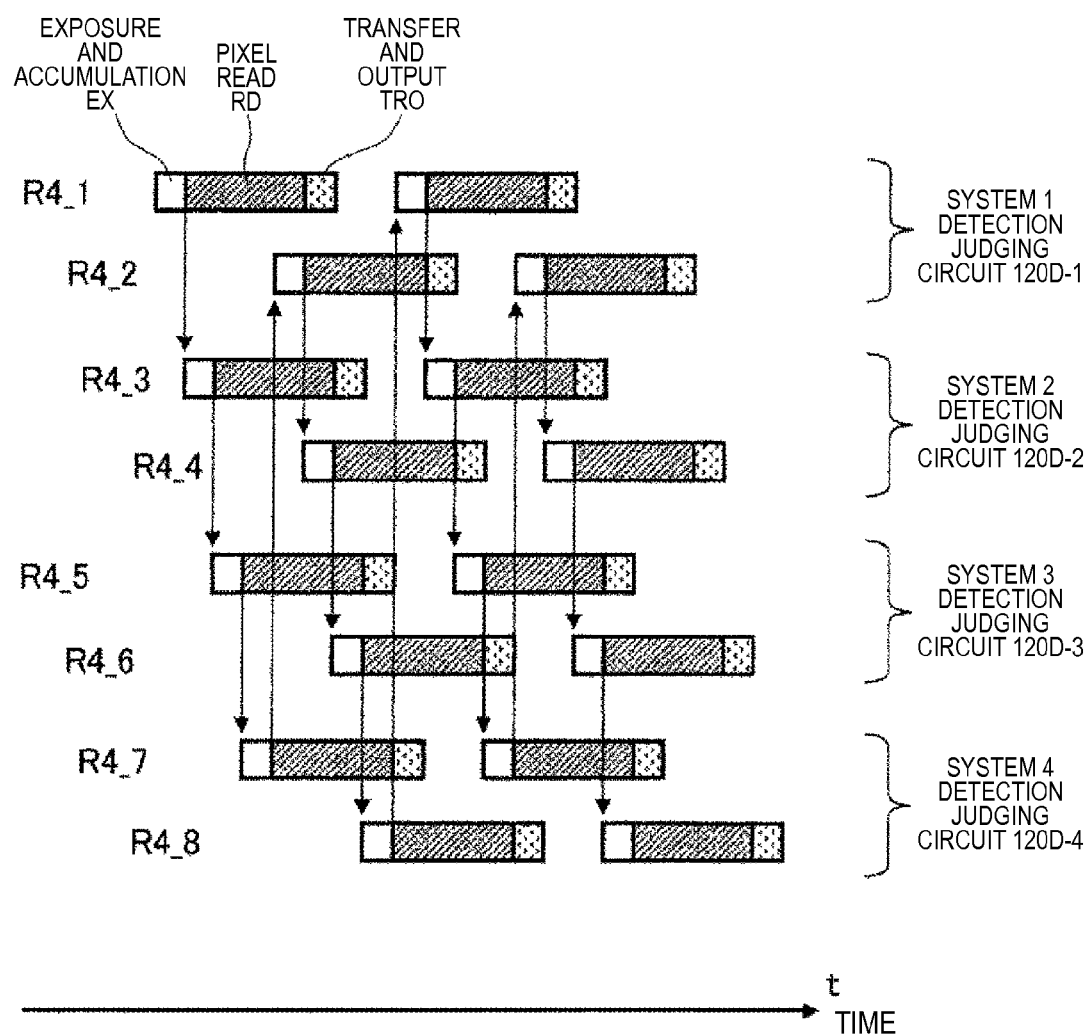
FIG. 19 is a view showing an example of exposure and accumulation and reading timing of each divided region in a radial ray detector according to a fourth embodiment.

FIG. 19 is a view showing an example of exposure and accumulation and reading timing of each divided region in the radial ray detector according to a fourth embodiment.

In the fourth embodiment, similarly, a single light receiving surface is divided into eight regions R4_1 to R4_8, and the pixel reading and the digital judgment are performed using four detection judging circuits 120D-1 to 120D-4. The exposure and accumulation are performed in a cyclical manner in order of the regions R4_1→R4_3→R4_5→R4_7→R4_2→R4_4→R4_6→R4_8. The cycle time of the exposure is ¼ by causing the four detection judging circuits to operate in parallel while shifting the timing. When the detection judging circuits require 5 μsec for the pixel reading and the digital judgment, the time resolution is shortened to 1.25 μsec. A remarkable advantage herein is that the reading operation in each detection judging circuit system does not overlap with each other.

In recent years, an introduction of a back side illumination imager increases the layout flexibility of metal wiring lines of a pixel region, so that a plurality of output signal lines from pixels are easily provided. This allows parallel operation of the four detection judging circuits. Furthermore, when a detector circuit can be disposed under a pixel array according to a three-dimensional structure, higher parallelization can be achieved.

In existing imagers, such parallelization aims at an improvement of a frame rate, and the circuits are basically operated in a simultaneous parallel manner. On the other hand, in the present technique, the plurality of detection judging circuits perform the operation while shifting the timing at almost the same interval corresponding to the exposure and accumulation cycle of the light receiving surface divided into the plurality of regions, whereby the time resolution of photodetection is increased.

In the circuit operation according to the CMOS imager described above, the reset timing of the photodiode in the pixels can be adjusted in the unit of the reading cycle. The common CMOS imager employs the adjustment for light quantity adjustment as an "electronic shutter."

Figure 20:
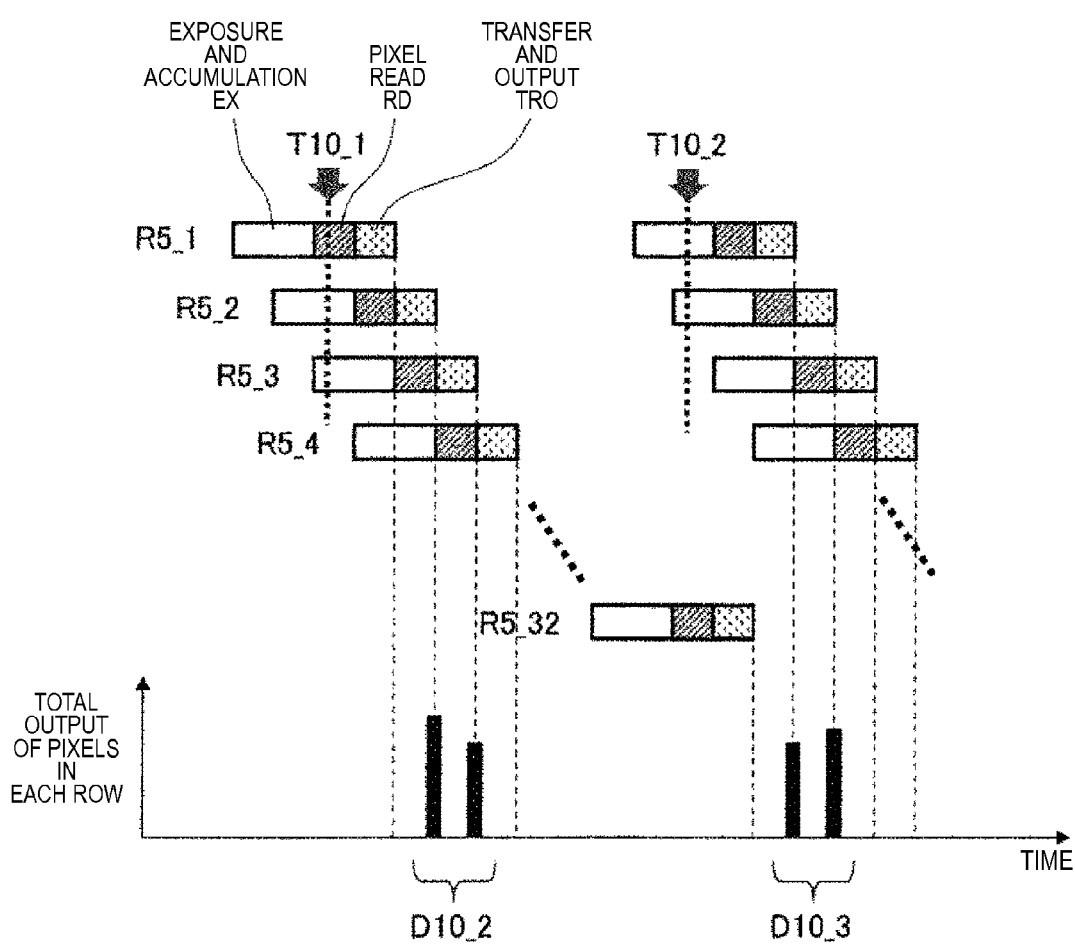
FIG. 20 is a view for explaining an example of adjusting the sensitivity and the time resolution in the radial ray detector according to the fourth embodiment.

On the other hand, the sensitivity and the time resolution can be adjusted by changing the timing also in the photodetector in the present technique. FIG. 20 is a view for explaining an example of adjusting the sensitivity and the time resolution in the radial ray detector in this embodiment. Herein, a light receiving surface is divided into 32 divisions of regions R5_1 to R5_32 and reading is performed by one circuit as in the second embodiment of FIG. 13 but the exposure period is doubled and the exposure of two divisions always overlaps with each other. Therefore, the effective sensitivity is doubled as compared with the operation as in the second embodiment. The data of the divisions in which the exposure overlaps with each other are continuously output.

At this time, scintillation light of a radial ray entering at a timing T10_1 is exposed in the region R5_2 and the region R5_3, and then output as an output D10_1. Scintillation light of a radial ray entering at a timing T10_2 is exposed in the region R5_1 and the region R5_2, and then output as an output D10_2. More specifically, when significant data are continuously output in two rows, it is judged that radial ray entered, and then the energy value is determined from the total thereof. At this time, the time resolution of the radial ray detection is the reading time for two divisions (i.e., two rows). The significance of the data may be judged by providing an arbitral threshold value in order to filter noises, such as dark current.

Similarly, the exposure of the A division overlaps with each other by increasing the exposure time by A times. The data of the divisions which are exposed in an overlapping manner are continuously output. At this time, the sensitivity increases by A times and the time resolution deteriorates to an A-times particle size.

Figure 21:
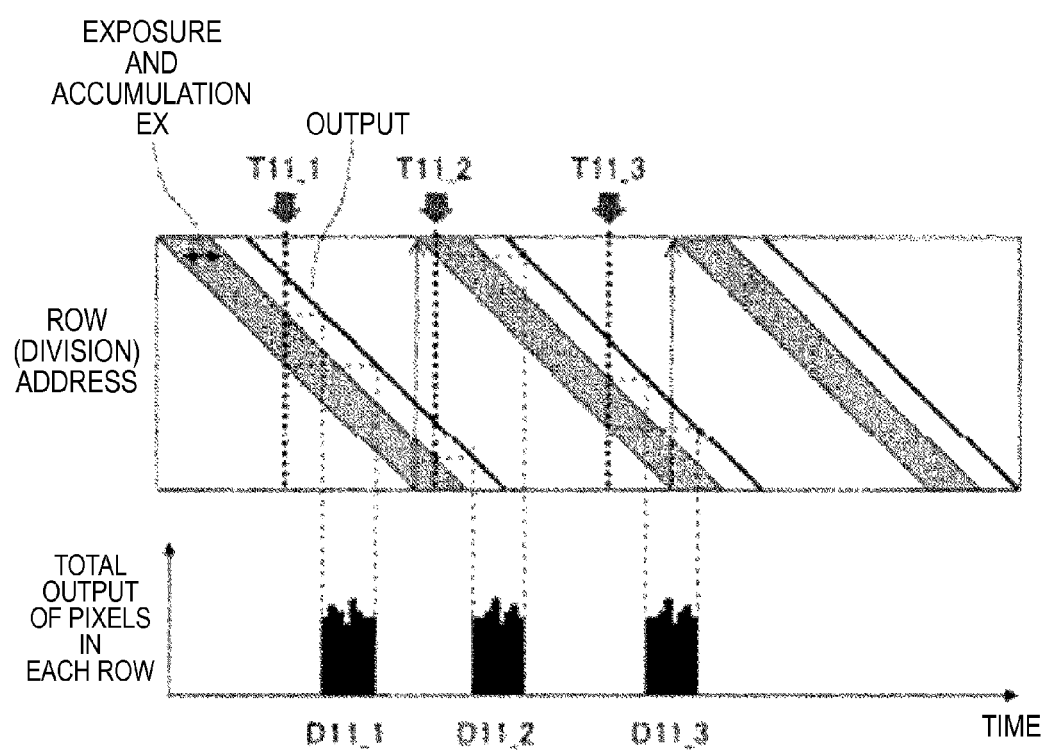
FIG. 21 is a view showing a general example of an output state to an exposure period in the radial ray detector according to the fourth embodiment.

FIG. 21 is a view illustrating a general example of an output state over an exposure period in the radial ray detector according to this embodiment. Pulsed light entering at timings of timings T11_1 to T11_3 are exposed in the plurality of divisions of the same number, and then output as outputs D11_1 to D11_3, respectively. At the same time, the divisions to be exposed need not to be continuous in space but the outputs are desirably continuous. Thus, the output can be regarded as a digital pulse having a fixed width. By counting each pulse, the number of the incident pulsed light (i.e., radial ray when the light is scintillation light) can be counted. The total of the data contained in an output pulse reflects the light intensity (i.e., radial ray energy) of the pulsed light.

By providing such a regulating function, one device can be used for a plurality of uses ranging from detection of a very slight amount of gamma rays to imaging of transmission X-rays with high incident frequency. Moreover, the trade-off between the sensitivity and the time resolution can be adjusted also in the same detector, and photodetection can be performed under the optimal conditions.

Thus, the dramatic improvement of the time resolution by the present technique allows energy discrimination and photon count of radial rays.

5. Fifth Embodiment

Configuration Example of Radial Ray Detector

Figure 22:
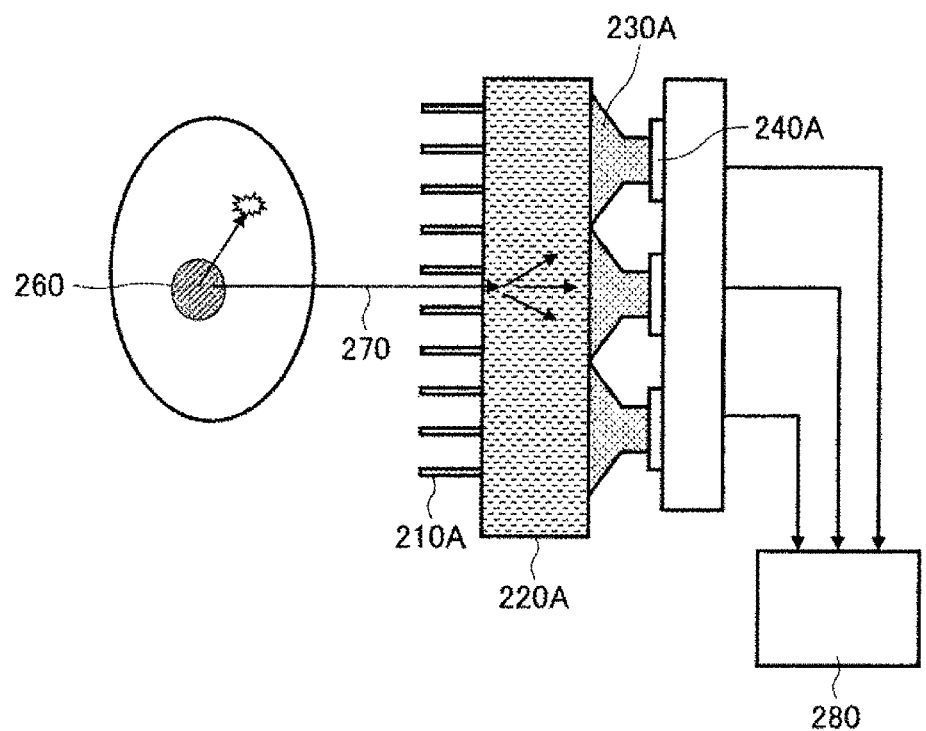
FIG. 22 is a view illustrating a configuration example of a radial ray detector according to a fifth embodiment.

FIG. 22 is a view illustrating a configuration example of a radial ray detector according to a fifth embodiment.

A radial ray detector 200A of FIG. 22 is an example of a SPECT device in which a single-plate scintillator 220A is shared by a plurality of detectors in order to achieve a less expensive configuration.

In the radial ray detector 200A, when a gamma ray 270 generated from a gamma-ray source 260 in the living body passes a collimator 210A to enter the scintillator 220A, the scintillator 220A shows fluorescence. A light guide 230A collects scintillation light, and guides the collected light to an image pickup device 240A. The light guide 230A has a light uniformizing function therein. The scintillation light is almost uniformized and emitted to a light receiving surface of the image pickup device 240A. The image pickup device 240A is an image pickup device of the present technique described above, in which the light receiving surface contains a plurality of pixel arrays, and the surface is divided into a plurality of regions, so that exposure is performed in a cyclical manner. Then, the light intensity measurement result in each region is output one by one as digital data.

An arithmetic unit 280 performs noise discrimination and position determination of each gamma ray in response to the output from each image pickup device 240A. When the scintillator 220A contains a single plate, the light emission is simultaneously detected by the plurality of image pickup devices 240A. The arithmetic unit 280 specifies the energy of gamma rays from the total output of events which simultaneously occurred and specifies the incident portion of gamma rays from the center of gravity of the output, for example. Thus, the number of times of events of the gamma rays which are judged to be a primary (not a noise) is counted, and the gamma-ray source distribution in the living body is identified.

Operation processing of determining the energy and the incident position of the radial rays from the outputs of the plurality of image pickup devices may include various variations according to digital processing in existing gamma cameras. The semiconductor photodetector (the image pickup device and the digital processing apparatus) of the present technique is small, lightweight, and less expensive as compared with a photomultiplier, and therefore a large number of the devices can be mounted with high density, so that the resolution of the position detection becomes high. Or, in the case where a plurality of gamma rays almost simultaneously enter different places, when the detectors are mounted with high density, the gamma rays appear in the output intensity distribution. Therefore, the discrimination and the detection can be achieved using pattern matching or the like.

In addition thereto, it is also effective to configure a dosimeter using a scintillator and the semiconductor photodetector of the present technique. Also in this case, since the energy detection and the photon count of radial rays can be simultaneously performed in parallel, the count rate according to the energy of radial rays, i.e., the energy spectrum of radial rays, can be measured, for example. For example, dose correction by G function, a DBM method, and the like described in Patent Literature (JP 2004-108796A) can be appropriately performed. Moreover, since the output of the detector is already digitized, a multichannel analyzer is also unnecessary and all the latter-stage processing steps including correction can be performed by a less expensive one-chip microcomputer. Thus, a dosimeter which is small and lightweight and has high precision can be realized.

Or, in fluorescence observation, when excitation light is emitted in a pulse shape, pulse-like fluorescence generates from a phosphor. When the time resolution of detection is increased using the present technique, fluorescence detection can be performed while scanning a larger number of inspection portions at high speed, so that the throughput of the observation can be sharply increased. Therefore, the photodetector using the present technique can be used also as photodetectors for a fluorescence scanner for DNA chip and a scanner for detecting photostimulated luminescence detection of an imaging plate.

6. Sixth Embodiment

Operation Example of Radial Ray Detector

Figure 23:
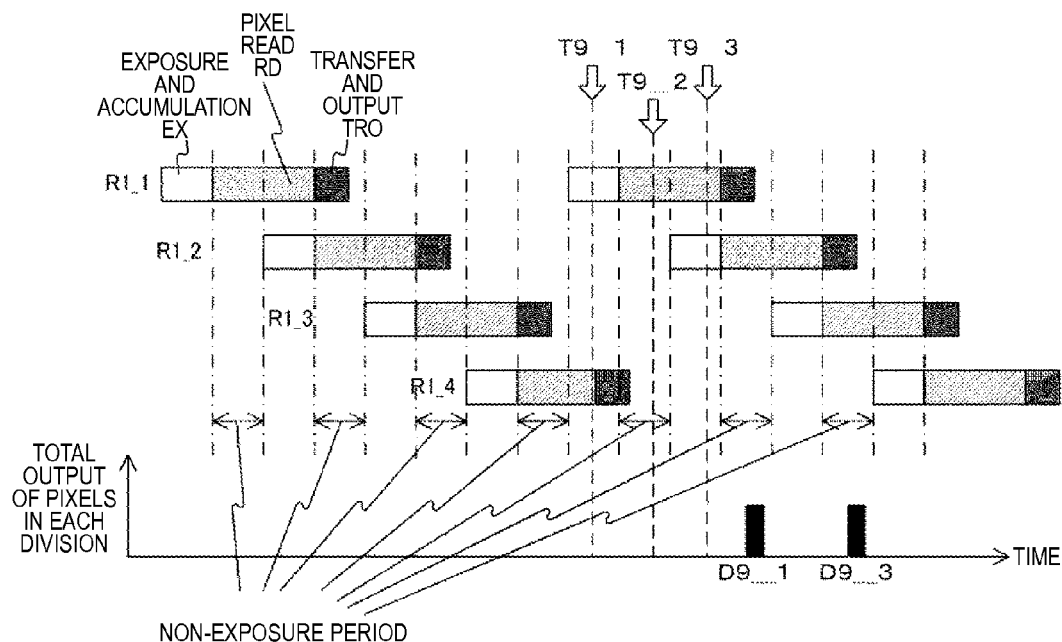
FIG. 23 is a view showing an example of exposure and accumulation and reading timing of each divided region in a radial ray detector according to a sixth embodiment.

FIG. 23 is a view showing an example of exposure and accumulation and reading timing of each divided region in a radial ray detector according to a sixth embodiment.

In a digital processing apparatus 250 of the sixth embodiment, after a fixed period passes after the completion of exposure of one division of two divisions adjacent in the exposure order, the other division is subjected to exposure. Therefore, a period in which any division is not exposed (hereinafter referred to as a "non-exposure period") generates between the adjacent exposure periods.

The number of photons which are made to enter in the non-exposure period can be estimated from the count value of the exposure period. For example, when the length ratio of the exposure period to the non-exposure period is set to 1:(a−1), the number of radial rays in the non-exposure period is estimated to be (a−1) times larger than the number of radial rays in the exposure period. Herein, a is a real number larger than 1. Therefore, the number of the radial rays in the exposure period and the non-exposure period (hereinafter referred to as a "measurement period") is a-times larger than the number of the radial rays in the exposure period. Therefore, the digital processing apparatus 250 outputs a value obtained by multiplying the counted value of the radial rays in the exposure period by a-times as the counted value of the radial rays in the measurement period.

It is supposed that three radial rays consecutively enter at timings of T9_1, T9_2, and T9_3 as illustrated in FIG. 23. At the timing of T9_1, only a division of R1_1 is exposed, and then a charge is accumulated. On the other hand, the timing of T9_2 is the non-exposure period, and no division is exposed. Furthermore, at the timing of T9_3, only a division of R1_2 is exposed, and then a charge is accumulated. As a result, outputs D9_1 and D9_3 corresponding to T9_1 and T9_3, respectively, are not mixed with other outputs and are completely separated.

Herein, since the radial rays which are made to enter at the timing of T9_2 are not reflected to the output at all, the radial ray counted value needs to be corrected according to the non-exposure period. Herein, the length of the non-exposure period is equal to the length of the exposure period (i.e., a=2). In this case, the digital processing apparatus 250 performs correction of doubling the radial ray counted value in the exposure period.

By such exposure control and counted value correction, the effective time resolution of the light receiving unit is not limited by the detection required time of the detection judging circuit and is determined only by the exposure time of each division. In other words, since only the radial rays in the exposure period among the radial rays which are made to enter in the measurement period may be counted, the throughput of the processing of judging the presence or absence of the radial rays and counting the same may be reduced.

In former CMOS imagers aiming at general imaging, such a non-exposure period as the entire light receiving unit is not intentionally provided and a state where the non-exposure period is not provided is not separately derived therefrom. Therefore, the circuit for the exposure control and the correction as shown in FIG. 23 has a specification peculiar to a use of measuring the intensity of a single light pulse or the number of times of incidence thereof, such as counting of radial rays.

[Configuration Example of Pixel]

Figure 24:
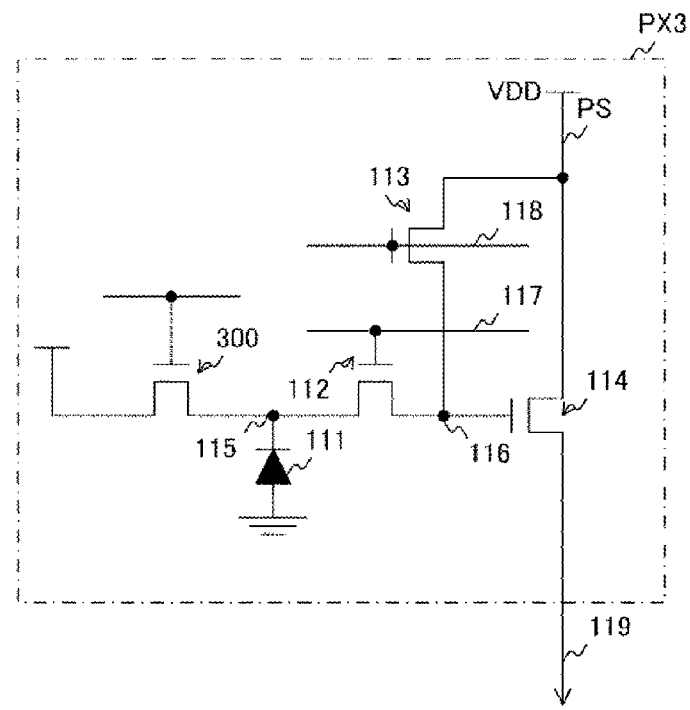
FIG. 24 is a view illustrating one example of the circuit configuration of a pixel according to the sixth embodiment.

FIG. 24 shows one example of a pixel PX3 according to the sixth embodiment in which extreme shortening of the exposure period can be achieved and an improvement of the time resolution can be achieved supposing the operation of FIG. 23. The pixel PX3 is different from the pixel of the first embodiment illustrated in FIG. 8 in further having a reset transistor 300. The reset transistor 300 extracts the accumulated charges in a photodiode 111 to a power supply, and resets the state to a state before accumulation. A gate electrode of the reset transistor 300 is connected to a reset line and a drain electrode thereof is connected to an accumulation node 115.

Figure 25:
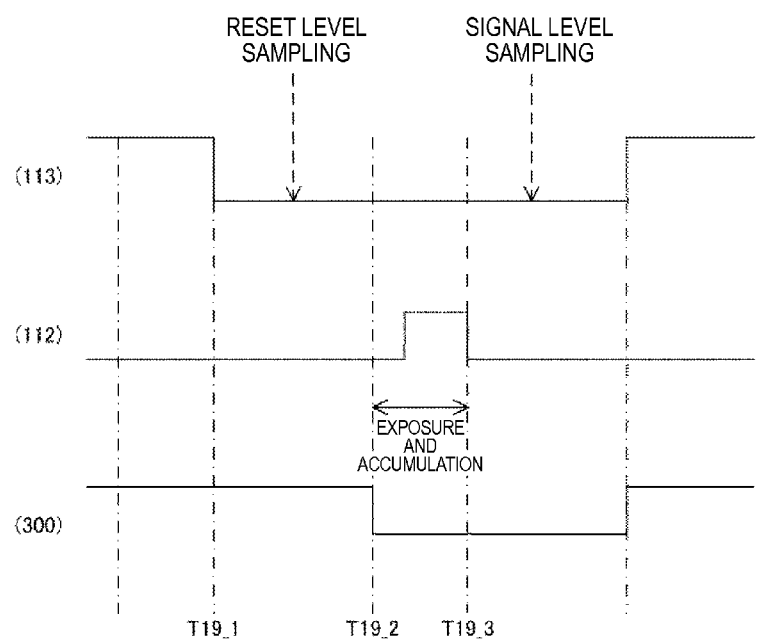
FIG. 25 is a timing chart showing one example of control of the pixel according to the sixth embodiment.

FIG. 25 is a timing chart showing one example of controlling the pixel in FIG. 24. An image pickup device 240G turns OFF a reset transistor 113 and a transfer transistor 112 and turns ON the reset transistor 300 at a timing T19_1, and then samples the reset level. Next, the image pickup device 240G turns OFF the reset transistor 300 at a timing T19_2, and starts exposure and accumulation. Then, the image pickup device 240G turns ON the transfer transistor 112, turns OFF the transfer transistor 112 when the exposure period passes (timing T19_3), and then samples the signal level. The image pickup device 240G extracts a difference between the reset level and the signal level by CDS (Correlated Double Sampling), and obtains a pixel signal.

In this operation, the sampling period is not contained at all in the exposure period and the exposure period is determined only based on the transfer pulse of the transfer transistor 112 and the reset timing of the reset transistor 300. Therefore, the exposure period can be shortened to the order of several nanoseconds to several tens of nanoseconds. By combining the same with the operation of FIG. 23, the effective time resolution of the image pickup device is also several nanoseconds to several tens of nanoseconds, so that the dynamic range of radial ray count improves by the order of several digits.

7. Seventh Embodiment

Configuration Example of Image Pickup Device

Figure 26:
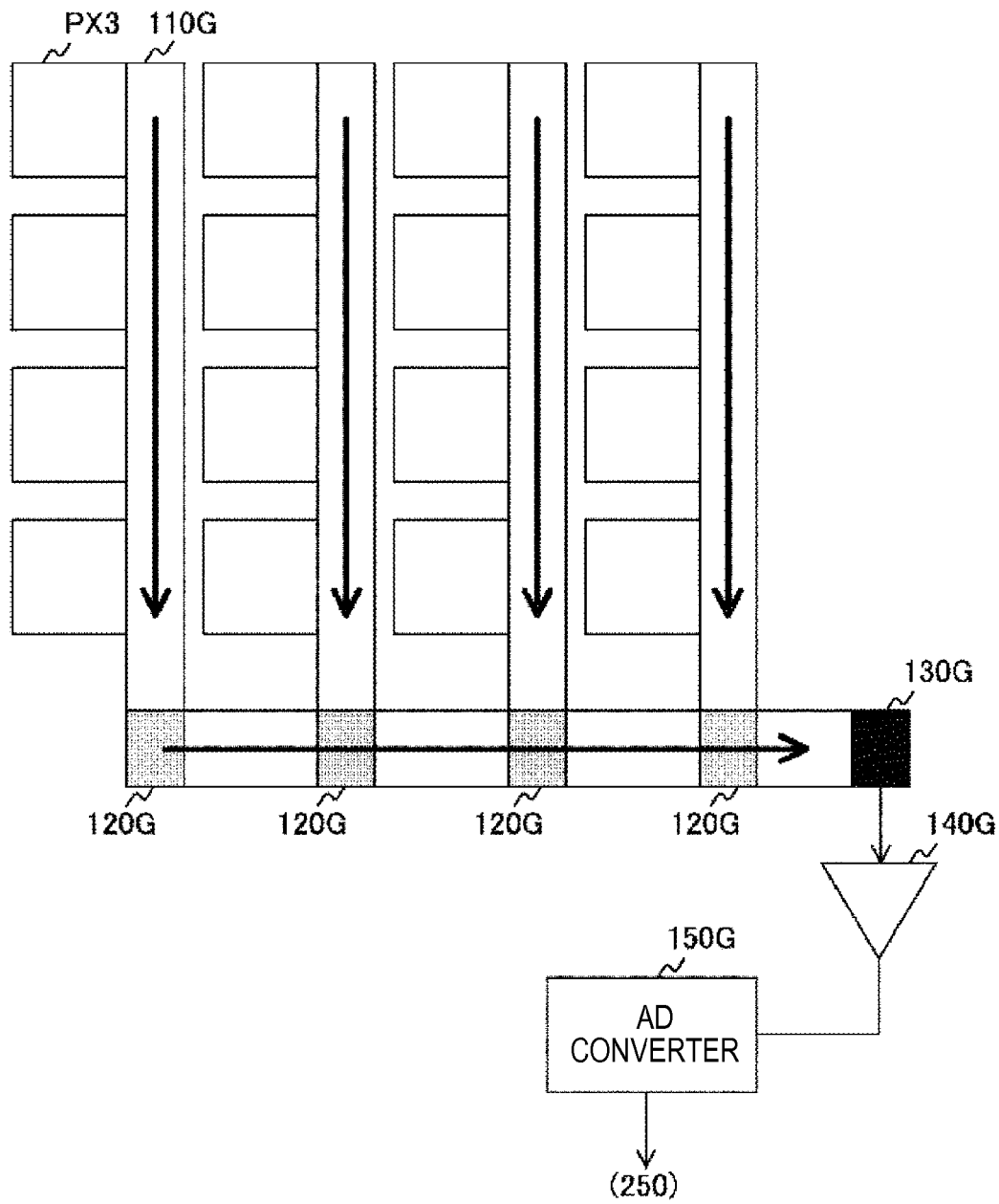
FIG. 26 is a view illustrating one example of an image pickup device in a radial ray detector according to a seventh embodiment.

FIG. 26 is a view illustrating one example of an image pickup device 240G in a radial ray detector according to a seventh embodiment. A technique of providing the non-exposure period by the electronic shutter described in the sixth embodiment to increase the time resolution of the radial ray count can also be applied to a global shutter device, such as a CCD (Charge Coupled Device) imager. The radial ray detector of the seventh embodiment is different from that of the sixth embodiment in providing the non-exposure period in the global shutter device.

The image pickup device 240G of the seventh embodiment has a plurality of pixels PX3, vertical CCD registers 110G, nodes 120G and 130G, an amplifier 140G, and an A/D converter 150G.

The pixels PX3 are disposed in the shape of a two-dimensional lattice. The pixel PX3 has a photodiode and a transfer transistor and has an electronic shutter function of applying a bias to a substrate to discharge all the signal charges accumulated in a photodiode to the substrate.

The vertical CCD registers 110G hold the signal charge transmitted from each photodiode of the pixel arranged in the column direction and supply the signal charges to the nodes 120G.

The node 120G performs analog addition of signals from the vertical CCD registers 110G and then performs horizontal transfer thereof to the node 130G. The node 130G performs analog addition of a signal from each of the nodes 120G, and supplies the resultant signals to the amplifier 140G.

The amplifier 140G amplifies the signal from the node 130G, and then supplies the amplified signal to the A/D converter 150G. The A/D converter 150G converts the signal from the amplifier 140G to a digital output value, and then supplies the digital output vale to the digital processing apparatus 250.

Thus, the image pickup device 240G takes the pulsed light by scintillation into all the pixels by simultaneous exposure, performs vertical transfer or horizontal transfer thereof, performs analog addition thereof, and then outputs the result. On the other hand, the image pickup device 240G can start the next exposure during the process. Thus, in the image pickup device 240G employing a CCD or the like, simultaneous exposure is repeated in a cyclical manner in a frame unit.

FIG. 27 is a view showing an example of exposure and accumulation and reading timing of each divided region in the image pickup device of FIG. 26. FIG. 27a is a view showing an example of exposure and accumulation and reading when the exposure period is limited to ½ of the measurement period (exposure period and non-exposure period). It is supposed that three radial rays enter one by one at timings of T20_1, T20_2, and T20_3. At the T20_1, a pixel array is exposed and a charge is accumulated. On the other hand, at the timing of T20_2, the radial ray enters during the non-exposure period and no division is exposed. At the timing of T20_3, a pixel array is exposed again and a charge is accumulated. As a result, outputs D20_1 and D20_3 corresponding to the timings of T20_1 and T20_3, respectively, are not mixed with other outputs and are completely separated.

On the other hand, the radial ray entering at the timing of T20_2 is not reflected to the output at all, and, therefore, the radial ray counted value needs to be corrected according to the non-exposure period. Herein, the exposure period is ½ (i.e., a=2) of the measurement period, the digital processing apparatus 250 performs correction of doubling the radial ray counted value obtained from the output of the semiconductor light receiving element. Thus, the effective time resolution of the radial ray count improves to ½ of the frame cycle.

FIG. 27b is a view showing an example of exposure and accumulation and reading timing when the exposure period is limited to ¼ (i.e., a=4) of the measurement period (exposure period and non-exposure period). In this case, the radial ray counted value is corrected to a value 4 times the counted value. Such exposure control and count correction, the effective time resolution of a light receiving unit is not limited by the frame cycle and is determined only by the exposure time of each division.

In a global shutter device, such as a CCD, a large number of pixels are simultaneously exposed. Therefore, when the light emission amount of scintillation is sufficient, the energy resolution is easily secured. However, in such a device, the sampling cycle is limited by the time required for transmitting and outputting all the effective pixel data in frames. Therefore, in order to obtain counting accuracy, it is necessary to spend more time on the measurement.

Also in CMOS imagers including a photon counting type, a global shutter mechanism as in a CCD can be provided by separately providing an accumulation unit in the stage following a photodiode, for example. Herein, when all the effective pixels are simultaneously exposed, the same exposure adjustment as that of a CCD can be performed, and, in connection therewith, the same effects as those in the seventh embodiment are obtained.

Additionally, the present technology may also be configured as below.

(1)

A radiation detector including:

a scintillator which generates, when a radial ray enters, scintillation light having light intensity according to energy of the radial ray, and then supplies a photon of the scintillation light to each of a plurality of pixels;

a radial ray detection unit which detects whether or not the radial ray is made to enter based on a number of the photons supplied in an exposure period whenever the plurality of pixels are exposed by the scintillation light over the exposure period; and an exposure period adjusting unit which adjusts the exposure period based on an incident frequency of the detected radial ray.

(2)

The radiation detector according to (1), further including:

an exposure control unit which exposes each of a plurality of divisions each containing the plurality of pixels one by one by the scintillation light over the exposure period, wherein the radial ray detection unit detects whether not the radial ray is made to enter whenever any one of the plurality of divisions is exposed.

(3)

The radial ray detector according to (2), wherein the exposure control unit exposes two divisions adjacent in an exposure order while partially overlapping the exposure period of each of the divisions, and wherein the radial ray detection unit detects that the radial ray is made to enter once in both the two divisions when it is detected that the radial ray is made to enter both the two adjacent divisions.

(4)

The radiation detector according to (2), wherein the exposure control unit exposes, after completion of exposure of one of two divisions adjacent in an exposure order, exposes the other, and wherein the radial ray detection unit determines a number of times that the radial ray is made to enter in the exposure period and in the fixed period from a detection result of the radial rays in the exposure period.

(5)

The radial ray detector according to (2), including:

a plurality of reading circuits which simultaneously read output values of the pixels according to the number of the photons in the divisions different from each other, and supplied the output values to the radial ray detection unit, wherein the radial ray detection unit detects whether or not the radial rays are made to enter from the output values.

(6)

The semiconductor photodetector according to (1), further including:

an exposure control unit which exposes the plurality of pixels by the scintillation light over the exposure period, and, after a fixed period passes after the exposure period ends, exposes the plurality of pixels again by the scintillation light over the exposure period, wherein the radial ray detection unit determines a number of times that the radial rays are made to enter in the exposure period and the fixed period from the detection result of the radial rays in the exposure period.

(7)

The radial ray detector according to any one of (1) to (6), wherein the exposure period adjusting unit shortens the exposure period as the incident frequency is higher and lengthens the exposure time as the incident frequency is lower.

(8)

The radiation detector according to any one of (1) to (7), further including:

a light uniformizing unit which substantially uniformizes light quantity of the scintillation light, and then guides the light to the plurality of pixels.

(9)

The radial ray detector according to any one of (1) to (8), wherein each of the plurality of pixels supplies, to the radial ray detection unit, an output value according to the number of the photons supplied to the pixels in the exposure period.

REFERENCE SIGNS LIST 240,240A, 240B, 240C, 240G image pickup device
110,110A to 110C pixel array portion
110G vertical CCD register
PD100, PD100 A to PD 100C light receiving surface (light receiving unit)
120,120A to 120C detection judging circuit
120G node
130,130C register
130G node
140,140C output circuit
140G amplifier
150G A/D converter
PX1, PXA, PX2, PX3 pixel
111 photodiode
112 transfer transistor
113 reset transistor
114 amplifier transistor
115 accumulation node
116 detection node
200, 200A radial ray detector
210, 210A collimator
220, 220A scintillator
230, 230A light guide
240A image pickup device
250 digital processing apparatus
251 photon counting unit
252 radial ray detection unit
253 radial ray count rate calculating unit
254 exposure period adjusting unit
260 gamma-ray source
270 gamma ray
280 arithmetic unit
300 reset transistor

The invention claimed is:

1. A radiation detector comprising:
  a scintillator which generates, when a radial ray enters, scintillation light having light intensity according to energy of the radial ray, and then supplies photons of the scintillation light;
  a radial ray detection unit (a) with an array of pixels each comprising a photodetector, the pixels being subject to an exposure period during which the photodetectors generate charges in relation to the photons incident on the photodetectors and (b) which detects whether or not the radial ray is incident based on a number of the photons detected during the exposure period; and
  an exposure period adjusting unit which adjusts the exposure period of the photodetectors based on an incident frequency of detected radial rays,
  wherein,
  the incident frequency means a count of the detected radial rays within the exposure period.

2. The radiation detector according to claim 1, further comprising an exposure control unit which subjects the plurality of pixels to a plurality of exposure periods separated in time by a predetermined fixed period, wherein the radial ray detection unit determines a number of times that the radial rays are incident in the exposure periods and the fixed period from the detection result of the radial rays in the exposure periods.

3. The radiation detector according to claim 1, wherein the exposure period adjusting unit shortens the exposure period as the incident frequency increases and lengthens the exposure time as the incident frequency decreases.

4. The radiation detector according to claim 1, further comprising a light uniformizing unit which substantially uniformizes light quantity of the scintillation light, and then guides the light to the plurality of pixels.

5. The radiation detector according to claim 1, wherein each of the plurality of pixels supplies, to the radial ray detection unit, an output value according to the number of the photons supplied to the pixels in the exposure period.

6. The radiation detector according to claim 1, further comprising:
  an exposure control unit which exposes the photodetectors of each of a plurality of divisions of the plurality of pixels one by one to the scintillation light over the exposure period,
  wherein the radial ray detection unit detects whether not the radial ray is incident whenever any one of the plurality of divisions is exposed.

7. The radiation detector according to claim 6, wherein:
  the exposure control unit exposes two divisions adjacent in an exposure order while partially overlapping the exposure period of each of the divisions, and
  the radial ray detection unit detects that the radial ray is incident when photons are detected in both the two adjacent divisions.

8. The radiation detector according to claim 6, wherein:
  after completion of exposure of one of two divisions adjacent in an exposure order, the exposure control unit exposes the other of two divisions adjacent in the exposure order, and
  the radial ray detection unit determines a number of times that the radial ray is made to enter in the exposure period and in the fixed period from a detection result of the radial rays in the exposure period.

9. The radiation detector according to claim 6, comprising a plurality of reading circuits which simultaneously read output values of the pixels according to the number of the photons in the divisions different from each other, and supply the output values to the radial ray detection unit, wherein the radial ray detection unit detects whether or not the radial rays are incident from the output values.

* * * * *